United States Patent
Coenegracht

(10) Patent No.: US 11,754,791 B2
(45) Date of Patent: Sep. 12, 2023

(54) ASSEMBLY FOR A FIBER OPTIC CONNECTOR

(71) Applicant: CommScope Connectivity Belgium BVBA, Kessel-Lo (BE)

(72) Inventor: Philippe Coenegracht, Hasselt (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 17/563,654

(22) Filed: Dec. 28, 2021

(65) Prior Publication Data

US 2022/0196928 A1 Jun. 23, 2022

Related U.S. Application Data

(63) Continuation of application No. 16/460,669, filed on Jul. 2, 2019, now Pat. No. 11,226,456, which is a continuation of application No. 15/321,981, filed as application No. PCT/EP2015/064056 on Jun. 23, 2015, now Pat. No. 10,401,578.

(60) Provisional application No. 62/037,394, filed on Aug. 14, 2014, provisional application No. 62/016,075, filed on Jun. 23, 2014.

(51) Int. Cl.
G02B 6/38 (2006.01)

(52) U.S. Cl.
CPC ....... *G02B 6/38875* (2021.05); *G02B 6/3821* (2013.01); *G02B 6/3825* (2013.01); *G02B 6/3851* (2013.01); *G02B 6/3891* (2013.01); *G02B 6/3894* (2013.01); *G02B 6/3893* (2013.01); *G02B 6/3897* (2013.01)

(58) Field of Classification Search
None
See application file for complete search history.

(56) References Cited

U.S. PATENT DOCUMENTS

| | | |
|---|---|---|
| 4,759,601 A | 7/1988 | Knutsen et al. |
| 4,822,130 A | 4/1989 | Maranto et al. |
| 5,073,042 A | 12/1991 | Mulholland et al. |
| 5,214,732 A | 5/1993 | Beard et al. |
| 5,274,729 A | 12/1993 | King et al. |
| 5,450,519 A | 9/1995 | Iwanski et al. |
| 6,254,278 B1 | 7/2001 | Andrews et al. |
| 6,526,212 B1 | 2/2003 | Mishriky et al. |
| 6,579,014 B2 | 6/2003 | Melton et al. |
| 6,648,520 B2 | 11/2003 | McDonald et al. |

(Continued)

FOREIGN PATENT DOCUMENTS

| | | |
|---|---|---|
| EP | 1 430 339 B1 | 3/2007 |
| EP | 1 775 610 B1 | 12/2014 |

(Continued)

OTHER PUBLICATIONS

International Search Report for International Patent Application No. PCT/EP2015/064056 dated Nov. 18, 2015, 7 pages.

(Continued)

*Primary Examiner* — Rhonda S Peace
(74) *Attorney, Agent, or Firm* — Merchant & Gould P.C.

(57) ABSTRACT

A fiber optic connection system includes a fiber optic connector and an adapter assembly. The fiber optic connector is coupled to the adapter assembly with a fast coupling mechanism. The fast coupling mechanism allows the fiber optic connector to be mounted into the adapter assembly with rotation of the fiber optic connector relative to the adapter assembly less than a full turn.

12 Claims, 16 Drawing Sheets

(56) References Cited

U.S. PATENT DOCUMENTS

| | | |
|---|---|---|
| 7,044,650 B1 | 5/2006 | Fran et al. |
| 7,090,407 B2 | 8/2006 | Melton et al. |
| 7,137,747 B2 | 11/2006 | Chapman |
| 7,207,727 B2 | 4/2007 | Fran et al. |
| 7,264,402 B2 | 9/2007 | Theuerkorn et al. |
| 7,277,614 B2 | 10/2007 | Cody et al. |
| 7,686,519 B2 | 3/2010 | Lu |
| 7,744,286 B2 | 6/2010 | Lu et al. |
| 8,556,520 B2 | 10/2013 | Elenbaas et al. |
| 8,864,389 B2 | 10/2014 | Lin |
| 9,016,499 B2 | 4/2015 | Scholz et al. |
| 9,304,262 B2 | 4/2016 | Lu |
| 10,338,323 B2 | 7/2019 | Lu et al. |
| 2003/0063866 A1 | 4/2003 | Melton et al. |
| 2005/0041928 A1 | 2/2005 | Zimmel et al. |
| 2006/0035509 A1 | 2/2006 | O'Connor |
| 2006/0088248 A1 | 4/2006 | Tran et al. |
| 2006/0089049 A1 | 4/2006 | Sedor |
| 2006/0177181 A1 | 8/2006 | Szilagyi |
| 2007/0031103 A1 | 2/2007 | Tinucci et al. |
| 2007/0036487 A1 | 2/2007 | Grzegorzewska et al. |
| 2007/0230857 A1 | 10/2007 | Tamiya |
| 2009/0148101 A1 | 6/2009 | Lu et al. |
| 2010/0086260 A1 | 4/2010 | Parikh et al. |
| 2011/0058785 A1 | 3/2011 | Solheid et al. |
| 2012/0252244 A1 | 10/2012 | Elkins, II et al. |
| 2014/0064671 A1 | 3/2014 | Barnette, Jr. et al. |
| 2014/0219615 A1 | 8/2014 | Petersen et al. |
| 2014/0226937 A1 | 8/2014 | Elenbaas et al. |
| 2014/0241670 A1 | 8/2014 | Barnette, Jr. et al. |
| 2017/0219779 A1 | 8/2017 | Takano et al. |

FOREIGN PATENT DOCUMENTS

| | | |
|---|---|---|
| WO | 00/31575 A1 | 6/2000 |
| WO | 2009/076364 A2 | 6/2009 |

OTHER PUBLICATIONS

Extended European Search Report for Application No. 19213750.3 dated Mar. 19, 2020.

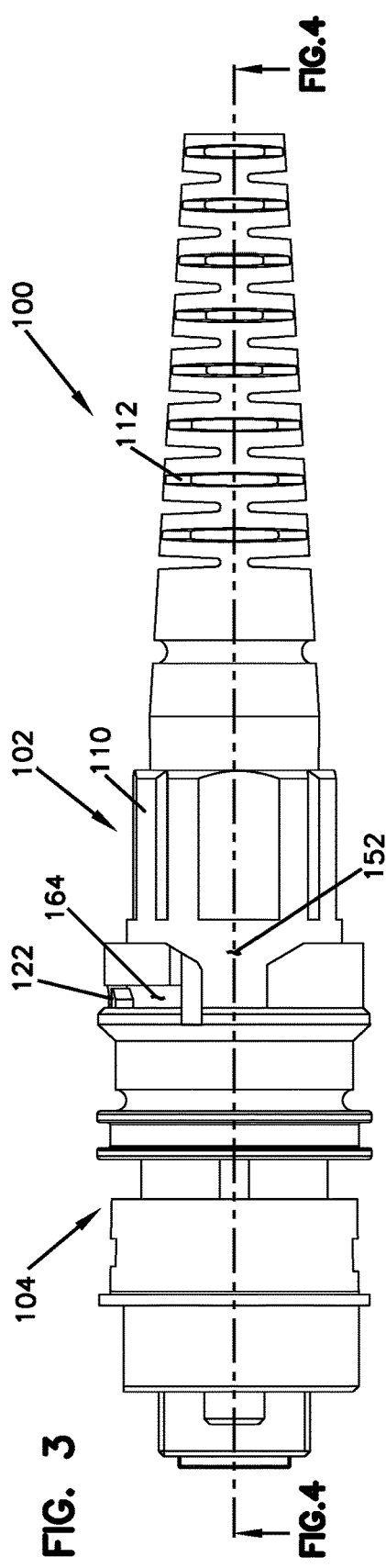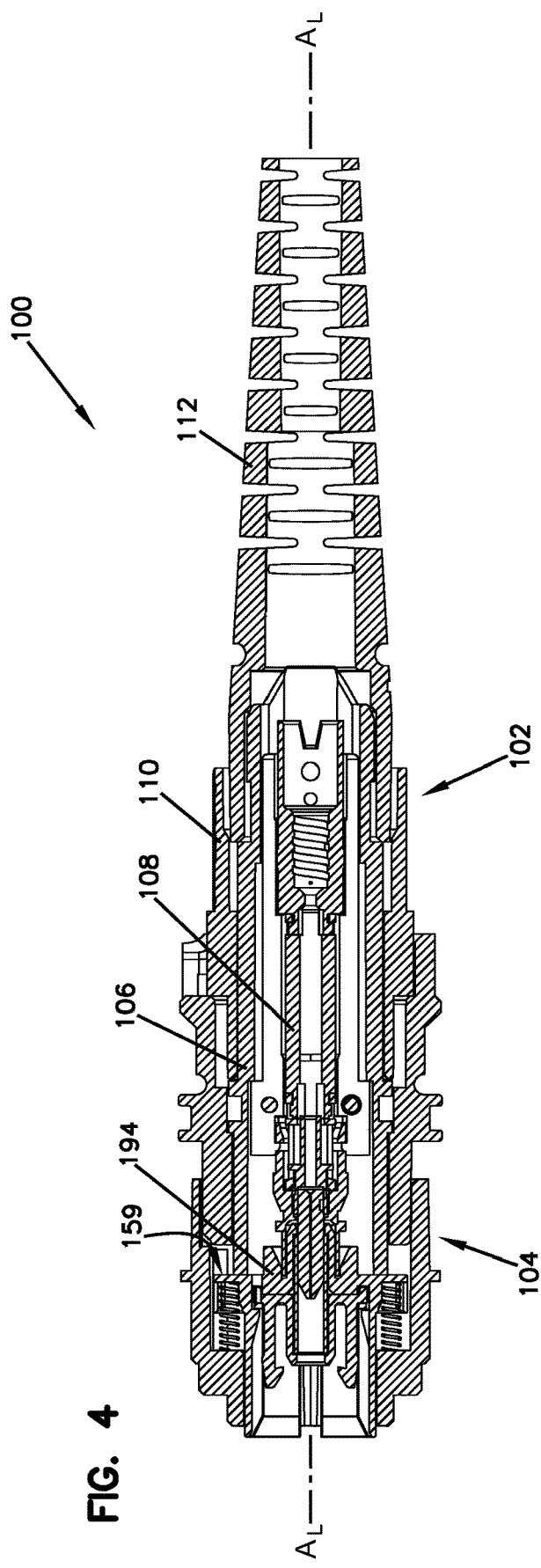

ASSEMBLY FOR A FIBER OPTIC CONNECTOR

CROSS-REFERENCE TO RELATED APPLICATION(S)

This application is a Continuation of U.S. patent application Ser. No. 16/460,669, filed on Jul. 2, 2019, now U.S., Patent No. 11,226,456, which is a Continuation of U.S. patent application Ser. No. 15/321,981 filed on Dec. 23, 2016, now U.S. Pat. No. 10,401,578, which is a National Stage of PCT/EP2015/064056 filed on Jun. 23, 2015, which claims priority to U.S. Patent Application Ser. No. 62/016,075 filed on Jun. 23, 2014, and to U.S. Patent Application Ser. No. 62/037,394 filed on Aug. 14, 2014, the disclosures of which are incorporated herein by reference in their entireties. To the extent appropriate a claim of priority is made to each of the above disclosed applications.

TECHNICAL FIELD

The present disclosure relates generally to optical fiber communication systems. More particularly, the present disclosure relates to a fiber optic connector and a mating adapter with a fast coupling mechanism.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected together without requiring a splice, and also allow such optical fibers to be easily disconnected from one another. Fiber optic connectors can be used to optically interconnect two lengths of optical fiber. Fiber optic connectors can also be used to interconnect lengths of optical fiber to passive and active equipment.

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and a fiber optic adapter for mechanically and optically coupling the fiber optic connectors together. Fiber optic connectors generally include ferrules that support the ends of the optical fibers of the fiber optic cables. The end faces of the ferrules are typically polished and are often angled. The fiber optic adapter includes co-axially aligned ports (i.e., receptacles) for receiving the fiber optic connectors desired to be interconnected. The fiber optic adapter includes an internal sleeve that receives and aligns the ferrules of the fiber optic connectors when the connectors are inserted within the ports of the fiber optic adapter. With the ferrules and their associated fibers aligned within the sleeve of the fiber optic adapter, a fiber optic signal can pass from one fiber to the next. The adapter also typically has a mechanical fastening arrangement (e.g., a snap-fit arrangement) for mechanically retaining the fiber optic connectors within the adapter. One example of an existing fiber optic connection system is described in PCT Publication No. WO 2009/076364, the disclosure of which is hereby incorporated by reference. The fiber optic cable connection system disclosed in WO 2009/076364 employs a locking mechanism configured to selectively prevent a movement of the hardened or ruggedized fiber optic connector relative to the fiber optic adapter. The locking mechanism utilizes a thread engagement between the fiber optic connector and the adapter so that the fiber optic connecter is screwed into the adapter. The locking mechanism can ensure a strong engagement between the connector and the adapter, but requires multiple turns of the connector relative to the adapter for the engagement.

Another example of an existing fiber optic connection system is described in U.S. Pat. No. 8,556,520, the disclosure of which is hereby incorporated by reference. The fiber optic cable connection system disclosed in U.S. Pat. No. 8,556,520 employs a bayonet connection mechanism between the fiber optic connector and the adapter. Such a bayonet connection can allow a quick coupling of the connector to the adapter, but is not as robust an engagement as can typically be achieved with threaded connections. Further, the fiber optic adapters are typically secured within an opening in a wall of an enclosure such that the wall of the enclosure is secured between a flange defined by the adapter housing and a coupling nut secured to the adapter housing opposite to the flange. The adapters are provided with an axial sealing between the adapters and the wall of the enclosure. For example, a sealing element, such as an O-ring or elastomeric gasket, is disposed between the annular surface of the flange of the adapter housing and the exterior surface of the wall. As the coupling nut is tightened over the adapter housing, the adapter housing is pulled toward the exterior surface of the wall, thus compressing the sealing element and providing an axial sealing. An example of such fiber optic adapters is described in U.S. Pat. No. 7,207,727, the disclosure of which is hereby incorporated by reference. When a plurality of adapters is installed on the enclosure wall, the threaded engagement mechanism with the coupling nut needs enough space between the adapters on the wall to engage a tool or the installer's fingers around the adapters to tighten the coupling nut to the adapter housing.

SUMMARY

Teachings of the present disclosure relates to features that permit a fast coupling mechanism for assembling a hardened fiber optic connector with an adapter assembly, as well as firmly secure the fiber optic connector with the adapter to minimize signal losses at optical couplings between hardened fiber optic connectors.

One aspect is a fiber optic connector including at least one partial threaded portion. The at least partial threaded portion is provided on a partial circumference of the fiber optic connector. The fiber optic connector is configured to be axially inserted into an adapter assembly in an unlock position with the at least partial threaded portion aligned with at least one partial unthreaded nut portion of the adapter assembly. The fiber optic connector is configured to move from the unlock position to a lock position by rotating relative to the adapter assembly with an angle less than a full rotation. The at least one partial threaded portion engages at least one partial threaded nut portion of the adapter assembly in the lock position.

In some examples, the fiber optic connector may further includes a keying feature configured to limit an axial movement of the fiber optic connector as the fiber optic connector is inserted into the adapter assembly. The keying feature is further configured to align the at least one partial threaded portion to the at least one partial threaded nut portion of the adapter assembly before the fiber optic connector rotates from the unlock position to the lock position.

Another aspect is an adapter assembly including a bayonet connection mechanism and a floating ferrule alignment mechanism. The bayonet connection mechanism is configured to engage a fiber optic connector between lock and unlock positions. The floating ferrule alignment mechanism is supported within the adapter assembly.

Yet another aspect is an adapter assembly configured to mount to a port of an enclosure. The adapter assembly includes a housing, a twist-to-lock fastening mechanism, and a radial sealing member. The housing has outer and inner ports. The twist-to-lock fastening mechanism is arranged on the outer port of the housing and configured to axially receive a fiber optic connector in an unlock position and permit the fiber optic connector to rotate relative to the housing from the unlock position to a lock position with an angle less than a full rotation. The radial sealing member is supported by the housing and configured to radially engage the port of the enclosure to provide sealing against the enclosure.

Yet another aspect is an adapter assembly including an internal cavity and at least one partial threaded nut portion. The internal cavity is configured to receive a fiber optic connector and rotatably support the fiber optic connector between lock and unlock positions. The at least one partial threaded nut portion is provided on an inner circumference of the internal cavity. In an unlock position, the adapter assembly is configured to axially receive the fiber optic connector with the at least one partial threaded nut portion aligned with at least one partial unthreaded portion of the fiber optic connector. The adapter assembly is configured to permit the fiber optic connector to rotate from the unlock position to the lock position with an angle less than a full rotation. In the lock position, the at least one partial threaded nut portion engages at least one partial threaded portion of the fiber optic connector.

In some examples, the adapter assembly may further include a keying feature configured to limit an axial movement of the fiber optic connector as the fiber optic connector is inserted into the adapter assembly. The keying feature is further configured to align the at least one partial threaded portion to the at least one partial threaded nut portion of the adapter assembly before the fiber optic connector rotates from the unlock position to the lock position.

Some aspects of the disclosure relate to a fiber optic assembly including a fiber optic connector and an adapter assembly. The fiber optic connector may include a key and a threaded portion. The key is configured to radially protrude from the fiber optic connector. The threaded portion may be provided on a partial circumference of the fiber optic connector. The adapter assembly may include an internal cavity, a key slot, a rotation guide, and a threaded nut portion. The internal cavity is configured to rotatably receive the fiber optic connector between a lock position and an unlock position. The key slot is configured to receive the key of the fiber optic connector in the unlock position. The rotation guide is configured to receive and circumferentially guide the key of the fiber optic connector as the fiber optic connector rotates relative to the adapter assembly between the lock and unlock positions. The threaded nut portion is configured to mate with the threaded portion of the fiber optic connector in the lock position, and configured not to mate with the threaded portion of the fiber optic connector in the unlock position. The lock and unlock positions are switchable as the fiber optic connector rotates relative to the adapter assembly with an angle less than a full rotation.

In certain examples, the fiber optic connector may further include a second threaded portion circumferentially provided on the fiber optic connector and circumferentially spaced apart from the threaded portion. Correspondingly, the adapter assembly may further include a second threaded nut portion circumferentially spaced apart from the threaded nut portion. The second threaded portion mates with the second threaded nut portion in the lock position, and does not mate with the second threaded nut portion in the unlock position.

In certain examples, the rotation guide may include a groove configured to receive the key of the fiber optic connector as the fiber optic connector rotates from the unlock position. The groove may be provided circumferentially on an inner surface of the adapter assembly and include a stopper configured to limit a rotation of the key of the fiber optic connector when the fiber optic connector rotates relative to the adapter assembly at a predetermined stop angle.

In certain examples, the rotation guide may include a bayonet clearance slot configured to receive the key of the fiber optic connector as the fiber optic connector rotates from the unlock position. The bayonet clearance slot may be provided circumferentially around the adapter assembly and include a stopper configured to limit a rotation of the key of the fiber optic connector when the fiber optic connector rotates relative to the adapter assembly at a predetermined stop angle.

In certain examples, the rotation guide may have a first lateral surface and a second lateral surface opposing to the first lateral surface along a longitudinal axis of the adapter assembly. The fiber optic connector is interference-fitted to the adapter assembly in the lock position by engagement between the first threaded portion and the first threaded nut portion and between the key and one of the first and second lateral surfaces of the rotation guide.

Yet other aspects of the disclosure relate to an adapter assembly including an adapter housing and an adapter retention member. The adapter housing may include a sealing flange portion and a sealing member. The sealing member may be held by the sealing flange portion and provide a radial sealing of the adapter housing against an installation port of an installation wall. The adapter retention member may be configured to be coupled to the adapter housing to secure the adapter housing to the installation wall. The adapter housing may be is inserted into the installation port of the installation wall from a first side of the installation wall. The adapter retention member may be coupled to the adapter housing from a second side opposite to the first side. The sealing flange portion may engage a wall shoulder when the adapter housing is inserted into the installation port. The adapter housing and the adapter retention member may be snap-fitted together when axially pressed toward each other. The adapter housing may include a set of flexible tabs, and the adapter retention member includes a set of slots corresponding to the set of flexible tabs. The set of flexible tabs may be configured to snap-fitted to the set of slots. When the adapter housing is coupled to the adapter retention member with the installation wall therebetween, an axial end face of the adapter housing may be abutted to the wall shoulder of the installation wall and an axial end face of the adapter retention member may be abutted to the second side of the installation wall. The adapter assembly may further include a floating ferrule alignment mechanism inserted into, and supported by, the adapter retention member through a spring member.

BRIEF DESCRIPTION OF THE DRAWINGS

FIG. 3 is a side view of the fiber optic connection system of FIG. 1, illustrating a fiber optic connector is coupled to an adapter assembly in a lock position.

FIG. 4 is a side cross-sectional view of the fiber optic connection system of FIG. 3.

DETAILED DESCRIPTION

Figure 1:
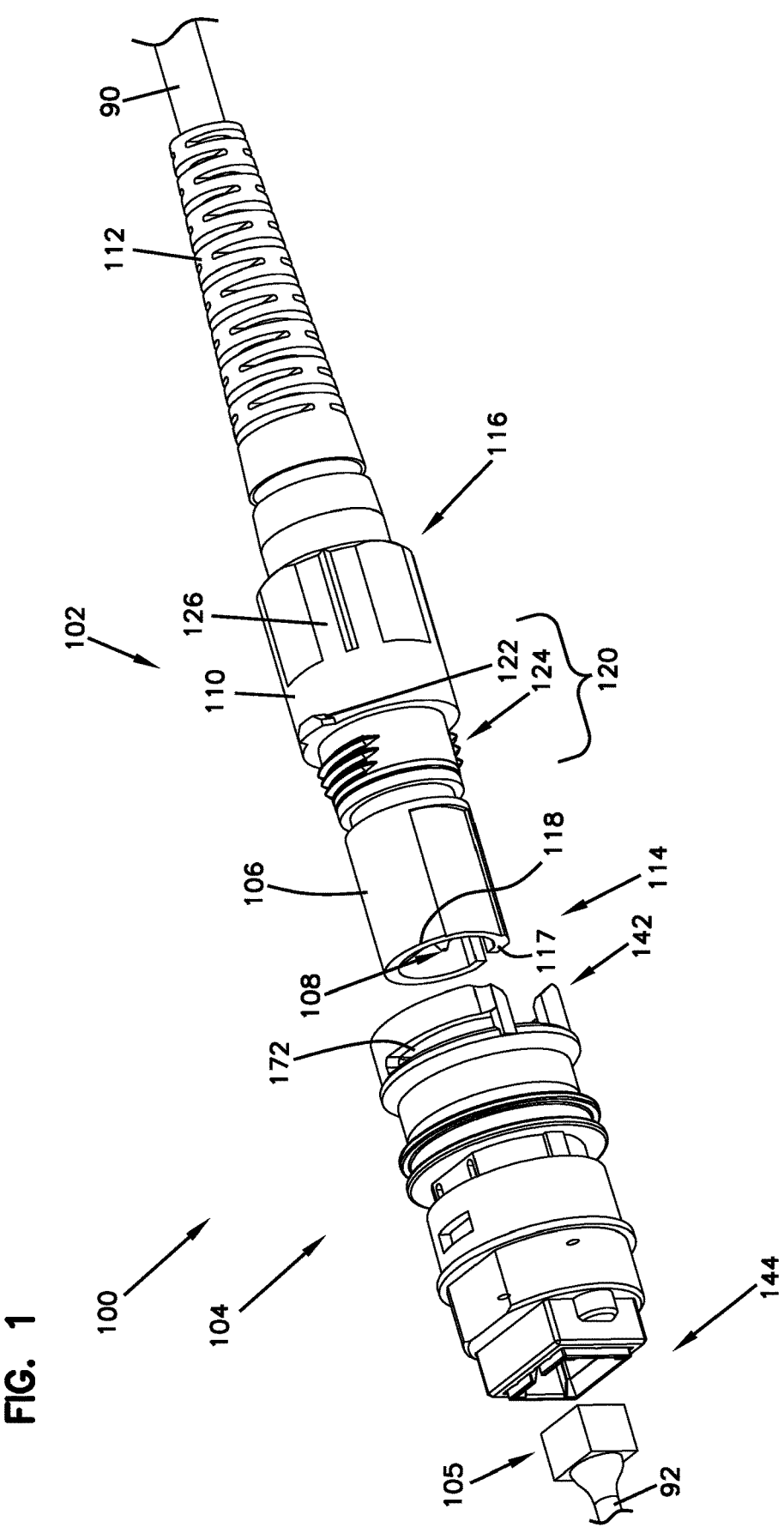
FIG. 1 is a front perspective view of a fiber optic connection system in accordance with an example of the present disclosure.
Figure 2:
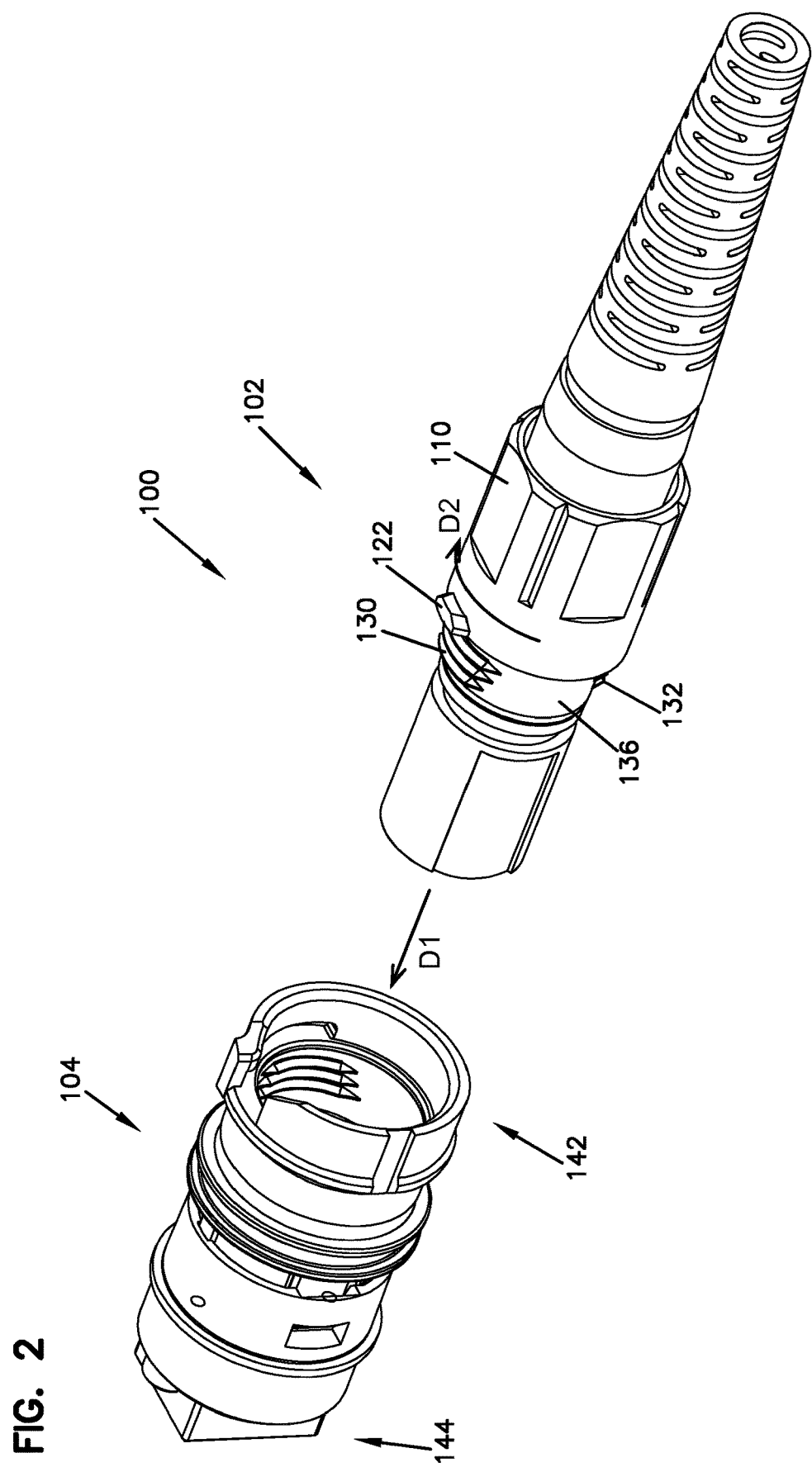
FIG. 2 is a rear perspective view of the fiber optic connection system of FIG. 1.
Figure 5:
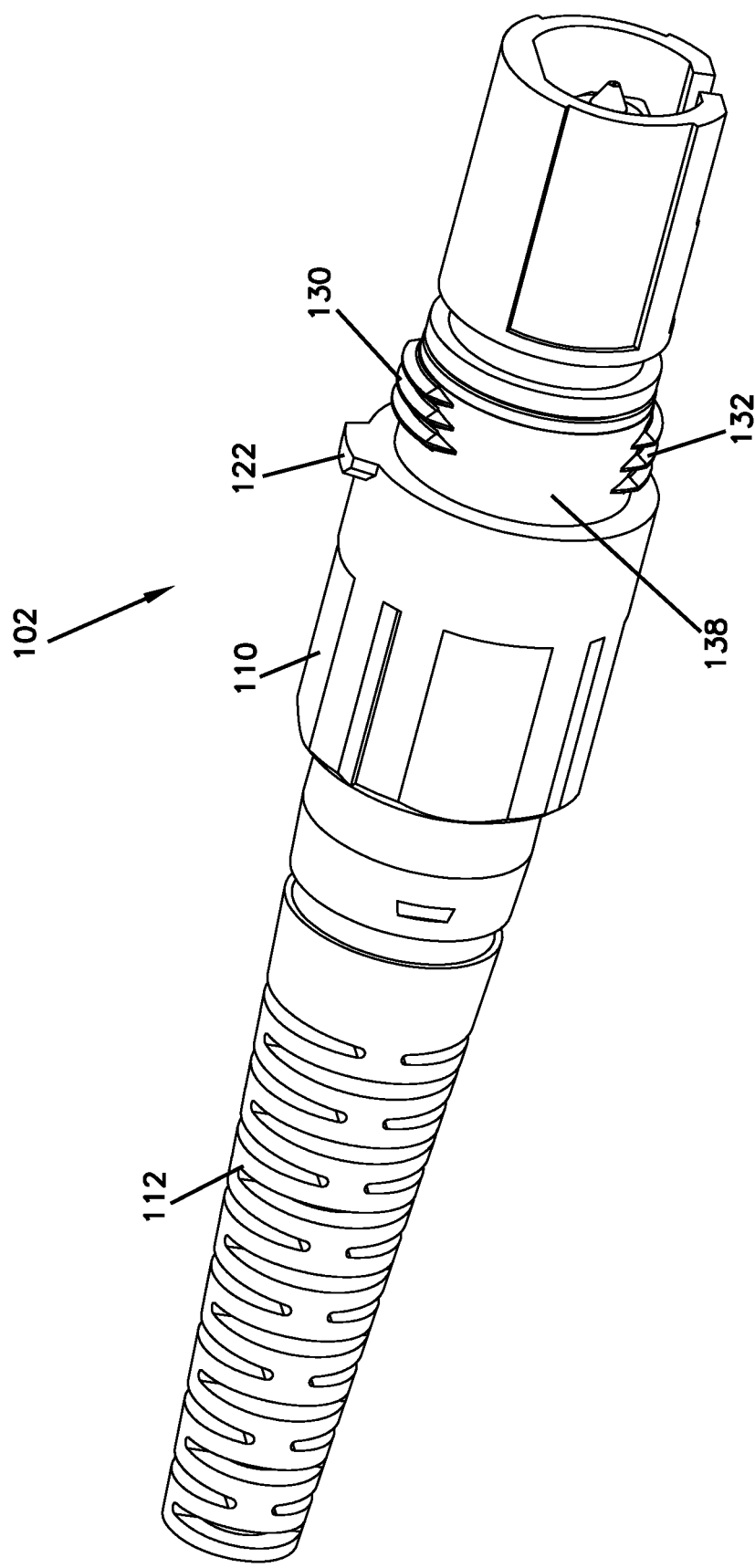
FIG. 5 is a perspective view of a fiber optic connector in accordance with one example of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIGS. 1-4 illustrate an example fiber optic connection system 100 in accordance with the principles of the present disclosure. The fiber optic connection system 100 includes a fiber optic connector 102 and an adapter assembly 104.

The fiber optic connector 102 is a hardened fiber optic connector that terminates a fiber optic cable 90. The fiber optic connector 102 can include a connector housing 106, a ferrule assembly 108, a coupling nut 110, and a strain relief boot 112.

The connector housing 106 is generally shaped as a cylindrical body having a forward end 114 and a rearward end 116. The connector housing 106 is configured to at least partially receive and support the ferrule assembly 108.

The ferrule assembly 108 is configured to support an end portion of an optical fiber of the fiber optic cable 90 and has a distal end face at which a polished end of the optical fiber is located. The distal end face of the ferrule assembly 108 is arranged at the forward end 114 of the connector housing 106 and configured to abut or be in close proximity to a distal end face of a second fiber optic connector 105 within the adapter assembly 104. The ferrule assembly 108 is held by the connector housing 106 and configured to align the end portion of the optical fiber of the fiber optic cable 90 to a ferrule holder 194 within the adapter assembly 104 so that the end portion of the optical fiber of the fiber optic cable 90 abut or is in close proximity to an end portion of an optical fiber of a second fiber optic cable 92 that is inserted into the adapter assembly 104.

The coupling nut 110 is coupled onto the connector housing 106 and provides a gripping surface for users. The coupling nut 110 can be at least partially rotatably mounted onto the connector housing 106. The coupling nut 110 can also include a first coupling mechanism 120 configured to selectively mate with a second coupling mechanism 150 of the adapter assembly 104 to provide keyed positioning of the fiber optic connector 102 relative to the adapter assembly 104 and to serve to align the ferrule assembly 108 with the ferrule holder 194 within the adapter assembly 104. In some embodiments, the coupling nut 110 is integrally formed with the connector housing 106 or as part of the connector housing 106. An example of the first and second coupling mechanisms 120 and 150 are described below in further detail.

The strain relief boot 112 is engaged with the connector housing 106 at the rearward end 116 and surrounds a portion of the fiber optic cable 90. The strain relief boot 112 provides strain relief and minimum bend radius control to the fiber optic cable 90 received within the connector housing 106.

The fiber optic connection system 100 can further include a second fiber optic connector 105 terminating a second fiber optic cable 92. The second fiber optic connector 105 is inserted into a second end 144 of the adapter assembly 104 so that the optical fiber of the second fiber optic cable 92 is abutted to, or in close proximity to, the end portion of the optical fiber of the cable 90 within the adapter assembly 104.

Referring to FIGS. 1-5, the first coupling mechanism 120 includes a key 122 and a coupling thread 124. The key 122 is configured to radially protrude from an outer surface 126 of the coupling nut 110. The coupling thread 124 includes one or more partially threaded portions (e.g., a first threaded portion 130 and a second threaded portion 132) and, correspondingly, one or more partially unthreaded portions (e.g., a first unthreaded portion 136 and a second unthreaded portion 138). The threaded portions 130 and 132 are provided on a partial circumference of the outer surface 126 of the coupling nut 110. For example, the threaded portions 130 and 132 are circumferentially provided on the outer surface 126 of the coupling nut 110 and spaced apart from each other. In some embodiments, the threaded portions 130 and 132 are spaced apart at equal distance. In the depicted embodiment, the first threaded portion 130 is spaced apart from the second threaded portion 132 around the circumference of the coupling nut 110 and arranged opposite to the second threaded portion 130 on the coupling nut 110. Corresponding to the threaded portions 130 and 132, the unthreaded portions 136 and 138 are alternately arranged between adjacent threaded portions 130 and 132. For example, the unthreaded portions 136 and 138 are circumferentially provided on the outer surface 126 of the coupling nut 110 and spaced apart from each other. In the depicted embodiment, the first unthreaded portion 136 is spaced apart from the second unthreaded portion 138 around the circumference of the coupling nut 110 and arranged opposite to the second unthreaded portion 138 on the coupling nut 110.

Referring to FIGS. 1-4, 6 and 7, the adapter assembly 104 has a first end 142 and a second end 144 opposite to the first end 142 along a longitudinal axis $A_L$. The first end 142 is configured to receive the fiber optic connector 102 between a lock position and an unlock position, and the second end 144 is configured to receive the second fiber optic connector 105. The adapter assembly 104 includes an internal cavity 146 open at the first end 142 and configured to engage the fiber optic connector 102 from the first end 142. The fiber optic connector 102 is rotatably engaged with the adapter assembly 104 (i.e., the internal cavity 146) between the lock position and the unlock position. As shown below, the lock position and the unlock position are switchable by rotating the fiber optic connector 102 relative to the adapter assembly 104 with a predetermined angle when the fiber optic connector 102 is inserted into the internal cavity 146 of the adapter assembly 104. In some embodiments, the predetermined angle is less than a full rotation (i.e., less than 360 degree) of the fiber optic connector 102 relative to the adapter assembly 104.

The adapter assembly 104 further includes a second coupling mechanism 150. In some embodiments, the second coupling mechanism 150 includes a key slot 152, a rotation guide 154, and a coupling nut thread 156.

The key slot 152 is configured to receive the key 122 of the fiber optic connector 102 in the unlock position. Along with the key 122 of the fiber optic connector 102, the key slot 152 operates to align the fiber optic connector 102 in the unlock position as the fiber optic connector 102 is inserted into the adapter assembly 104. In some embodiments, the key slot 152 includes an axial slot surface 160 configured to contact the key 122 and limit an axial movement of the fiber optic connector 102 as the fiber optic connector 102 is inserted into the adapter assembly 104 from the first end 142. The axial slot surface 160 also functions to align the coupling thread 124 (e.g., the first and second threaded portions 130 and 132) of the fiber optic connector 102 with the coupling nut thread 156 (e.g., the first and second threaded nut portions 180 and 182) of the adapter assembly 104 before they are engaged each other. The axial slot surface 160 permits all of the threads of the coupling thread 124 to be properly engaged with all of the coupling nut thread 156 before the fiber optic connector 102 rotates relative to the adapter assembly 104 from the unlock position to the lock position.

The rotation guide 154 is configured to receive and circumferentially guide the key 122 of the fiber optic connector 102 as the fiber optic connector 102 rotates relative to the adapter assembly 104 between the lock position and the unlock position. Similar to the axial slot surface 160, the rotation guide 154 operates to align the coupling thread 124 of the fiber optic connector 102 with the coupling nut thread 156 of the adapter assembly 104 before they are mated each other. Further, the rotation guide 154 also permits all of the threads of the coupling thread 124 to be properly engaged with all of the coupling nut thread 156 as the fiber optic connector 102 rotates relative to the adapter assembly 104 from the unlock position to the lock position.

Figure 6:
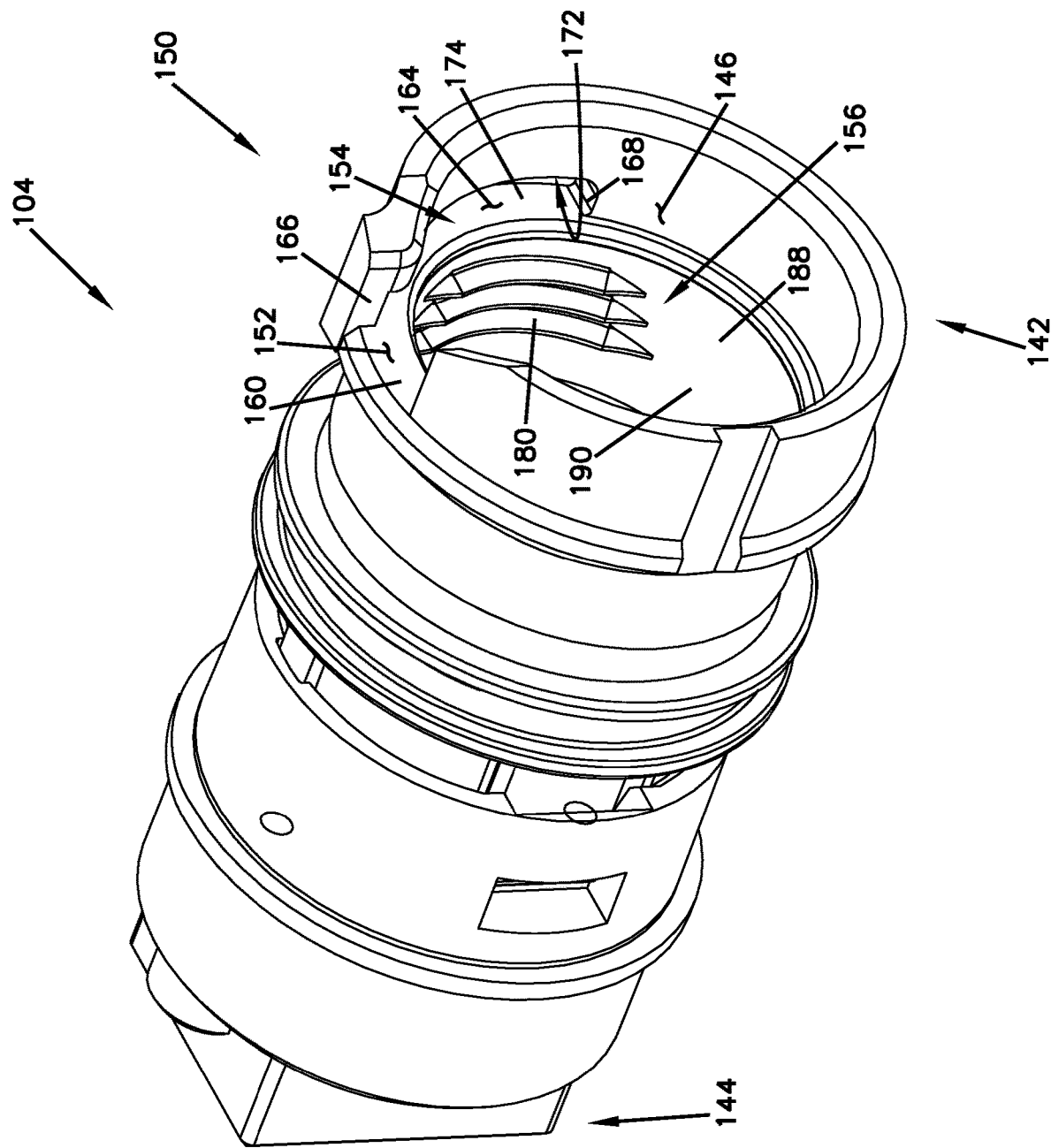
FIG. 6 is a front perspective view of an adapter assembly in accordance with an example of the present disclosure.
Figure 7:
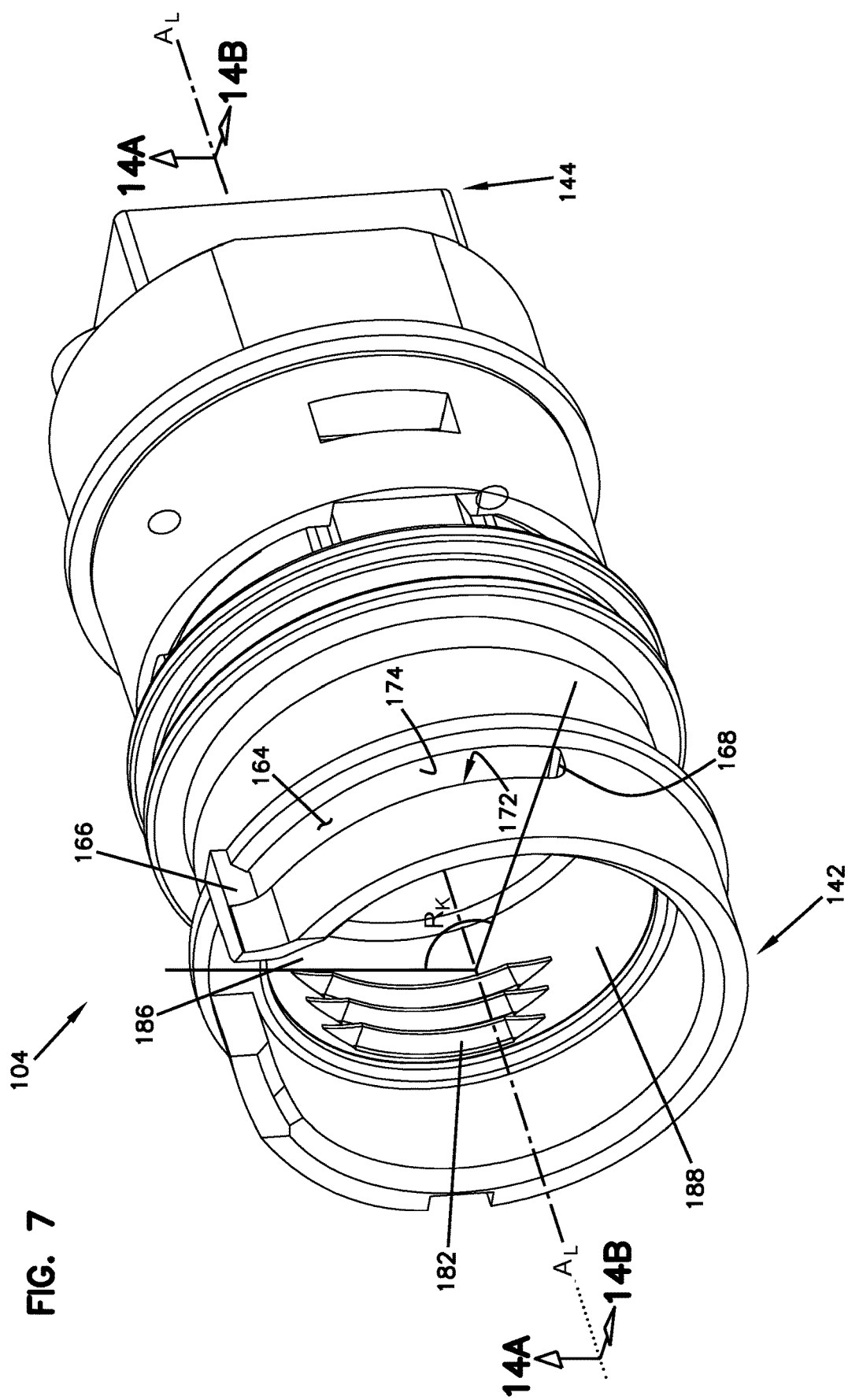
FIG. 7 is a rear perspective view of the adapter assembly of FIG. 6.

As illustrated in FIGS. 6 and 7, in some embodiments, the rotation guide 154 includes a bayonet clearance slot 164 arranged adjacent the key slot 152 and configured to receive the key 122 of the fiber optic connector 102 as the fiber optic connector 102 rotates from the unlock position (i.e., from the key slot 152). In some embodiments, the bayonet clearance slot 164 and the key slot 152 are divided by a dividing wall 166. As the fiber optic connector 102 rotates between the key slot 152 and the bayonet clearance slot 164, the key 122 slides on, and passes over, the dividing wall 166. The dividing wall 166 can be made flexible so as to resiliently deform as the key 122 slides on the dividing wall 166.

The bayonet clearance slot 164 is provided partially, circumferentially around the adapter assembly 104. In some embodiments, the bayonet clearance slot 164 has a stopper 168 at an end of the slot 164 opposite to the key slot 152 (or opposite to the dividing wall 166). The stopper 168 is configured to limit a rotational range of the fiber optic connector 102 relative to the adapter assembly 104. For example, the stopper 168 contacts the key 122 of the fiber optic connector 102 and prevents a further rotation of the fiber optic connector 102 when the fiber optic connector 102 rotates relative to the adapter assembly 104 at a predetermined angle $R_K$. The predetermined angle $R_K$ is defined an angle between the key slot 152 and the stopper 168 about a center through which the longitudinal axis $A_L$ passes. As shown below, the first and second coupling mechanisms 120 and 150 are configured to cause the fiber optic connector 102 to be in the lock position when the fiber optic connector 102 is rotated relative to the adapter assembly 104 from the key slot 152 at an angle not greater than the predetermined angle $R_K$.

In some embodiments, the fiber optic connector 102 is interference-fit to the adapter assembly 104 by frictional forces generated by the threaded engagement between the coupling thread 124 (e.g., the first and second threaded portions 130 and 132) of the fiber optic connector 102 and the coupling nut thread 156 (e.g., the first and second threaded nut portions 180 and 182) of the adapter assembly 104. When the fiber optic connector 102 is inserted into the adapter assembly 104, the forward end 114 of the fiber optic connector 102 is abutted with an engaging face 159 (FIGS. 4 and 14). As the fiber optic connector 102 rotates relative to the adapter assembly 104 with an angle less than a full turn, the threaded engagement between the fiber optic connector 102 and the adapter assembly 104, as well as the engagement of the forward end 114 of the fiber optic connector 102 against the engaging face 159 of the adapter assembly 104, creates the interference fit between the fiber optic connector 102 and the adapter assembly 104.

In other embodiments, the bayonet clearance slot 164 has a first lateral surface 172 (FIG. 1) and a second lateral surface 174 opposing to the first lateral surface 172 along the longitudinal axis $A_L$. The first lateral surface 172 is arranged close to the first end 142, and the second lateral surface 174 is arranged away from the first end 142 (i.e., close to the second end 144) of the adapter assembly 104. When the key 122 of the fiber optic connector 102 is engaged to the bayonet clearance slot 164, the key 122 can be biased to either of the first and second lateral surface 172 and 174 by one or more different mechanisms, thereby providing interference-fit of the fiber optic connector 102 to the adapter assembly 104.

The coupling nut thread 156 includes one or more partial threaded nut portions (e.g., a first threaded nut portion 180 and a second threaded portion 182) and, correspondingly, one or more partially unthreaded portions (e.g., a first unthreaded nut portion 186 and a second unthreaded nut portion 188). The threaded nut portions 180 and 182 are provided on a partial circumference of an inner surface 190 of the adapter assembly 104. For example, the threaded nut portions 180 and 182 are circumferentially provided on the inner surface 190 of the adapter assembly 104 and spaced apart from each other. In some embodiments, the threaded nut portions 180 and 182 are spaced apart at equal distance. In the depicted embodiment, the first threaded nut portion 180 is spaced apart from the second threaded nut portion 182 around the circumference of the inner surface 190 of the adapter assembly 104 and arranged opposite to the second threaded nut portion 182. Corresponding to the threaded nut portions 180 and 182, the unthreaded nut portions 186 and 188 are alternately arranged between adjacent threaded nut portions 180 and 182. For example, the unthreaded nut portions 186 and 188 are circumferentially provided on the inner surface 190 of the adapter assembly 104 and spaced apart from each other. In the depicted embodiment, the first unthreaded nut portion 186 is spaced apart from the second unthreaded nut portion 188 around the circumference of the inner surface 190 of the adapter assembly 104 and arranged opposite to the second unthreaded nut portion 188.

The unthreaded nut portions 186 and 188 of the adapter assembly 104 are configured and arranged to receive the threaded portions 130 and 132 of the fiber optic connector 102 when the fiber optic connector 102 is inserted, in a first direction D1, into the adapter assembly 104 with the key 122 aligned to the key slot 152 (i.e., the unlock position). Correspondingly, the threaded nut portions 180 and 182 of the adapter assembly 104 are configured and arranged to be nested onto the unthreaded portions 136 and 138 of the fiber optic connector 102 in the lock position. Further, the threaded nut portions 180 and 182 of the adapter assembly 104 engage the threaded portions 130 and 132 of the coupling nut 110 when the fiber optic connector 102 is rotated in a second direction D2 after being inserted into the adapter assembly 104.

Referring to FIG. 4, the adapter assembly 104 can include a ferrule holder 194 configured to align the ferrule assembly 108 thereto, thereby arranging the end portion of the optical fiber of the fiber optic cable 90 to abut or be in close proximity to an end portion of an optical fiber of a second fiber optic cable 92 that is inserted into the adapter assembly 104.

In some embodiments, the adapter assembly 104 further includes an anti-rotation mechanism 158 (FIG. 14) configured to correspond to a flat tip portion 117 and a rounded tip portion 118 of the connector housing 106 at or adjacent the forward end 114. Thus, when the flat and rounded tip portions 117 and 118 of the connector housing 106

Referring again to FIGS. 1 and 2, the fiber optic connector 102 is coupled to the adapter assembly 104 as follows. First, the fiber optic connector 102 is moved in the direction D1 and inserted into the internal cavity 146 of the adapter assembly 104 with the key 122 of the fiber optic connector 102 aligned to the key slot 152. This is referred to as the unlock position. In the unlock position, the threaded portions 130 and 132 of the fiber optic connector 102 mate with the unthreaded nut portions 186 and 188 of the adapter assembly 104, respectively, and the unthreaded portions 136 and 138 of the fiber optic connector 102 mate with the threaded nut portions 180 and 182, respectively.

Then, the fiber optic connector 102 is rotated in the direction D2 relative to the adapter assembly 104 so that the key 122 of the fiber optic connector 102 slides from the key slot 152 into the rotation guide 154 of the adapter assembly 104. The key 122 of the fiber optic connector 102 is guided along the rotation guide 154 as the fiber optic connector 102 is rotated relative to the adapter assembly 104. The fiber optic connector 102 is rotated until it is tightened with the adapter assembly 104. This position is referred to as the lock position. In the lock position, the threaded portions 130 and 132 of the fiber optic connector 102 mate with the threaded nut portions 180 and 182 of the adapter assembly 104, and the unthreaded portions 136 and 138 mate with the unthreaded nut portions 186 and 188.

As such, the partial threaded portions 130 and 132 (and the corresponding unthreaded portions 136 and 138) of the fiber optic connector 102, and the partial threaded nut portions 180 and 182 (and the corresponding unthreaded nut portions 186 and 188), allows switching between the lock and unlock positions only with a partial turn or rotation of the fiber optic connector 102 relative to the adapter assembly 104. Thus, a user need not rotate the fiber optic connector 102 in a full turn relative to the adapter assembly 104 to assemble them together. In the depicted embodiment where the opposing threaded portions 130 and 132 (and the opposing unthreaded portions 136 and 138), and the opposing threaded nut portions 180 and 182 (and the opposing unthreaded nut portions 186 and 188) are provided, the fiber optic connector 102 only needs to be rotated about 90 degree relative to the adapter assembly 104. Other configurations are possible to change the rotational angle to switch the fiber optic connector 102 between the lock and unlock positions.

In the lock position, the fiber optic connector 102 is interference-fit to the adapter assembly 104 by frictional forces generated by the threaded engagement between the coupling thread 124 (e.g., the first and second threaded portions 130 and 132) of the fiber optic connector 102 and the coupling nut thread 156 (e.g., the first and second threaded nut portions 180 and 182) of the adapter assembly 104. Further, the engagement of the forward end 114 of the fiber optic connector 102 against the engaging face 159 of the adapter assembly 104 can contribute to the interference fit, along with the threaded engagement between the fiber optic connector 102 and the adapter assembly 104.

In addition, or alternatively, when in the lock position, the key 122 of the fiber optic connector 102 can be biased to one of the first and second lateral surfaces 172 and 174 of the rotation guide 154, and the threaded portions 130 and 132 are engaged with the threaded nut portions 180 and 182. This configuration can help the interference fit of the fiber optic connector to the adapter assembly 104 so that the fiber optic connector is firmly secured into the adapter assembly 104.

Figure 8:
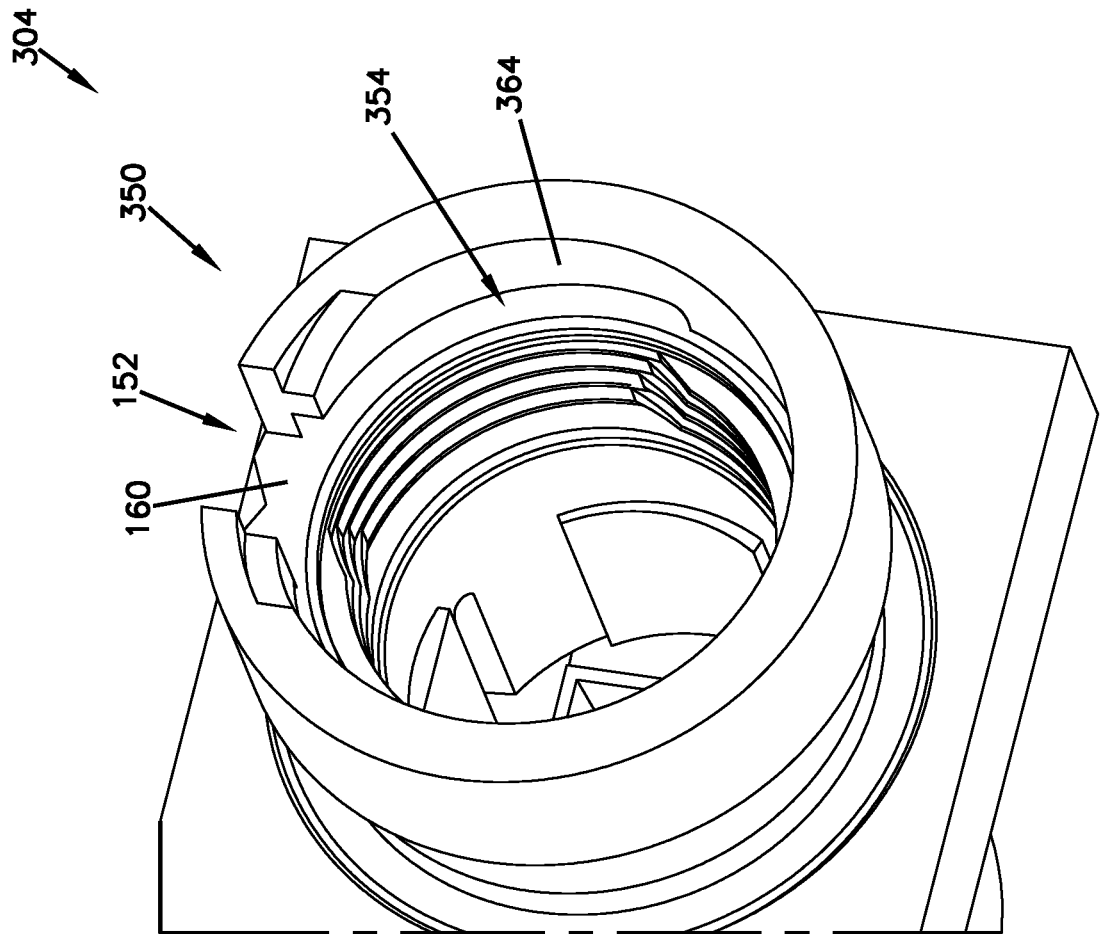
FIG. 8 is a perspective view of an adapter assembly in accordance with an example of the present disclosure.
Figure 9:
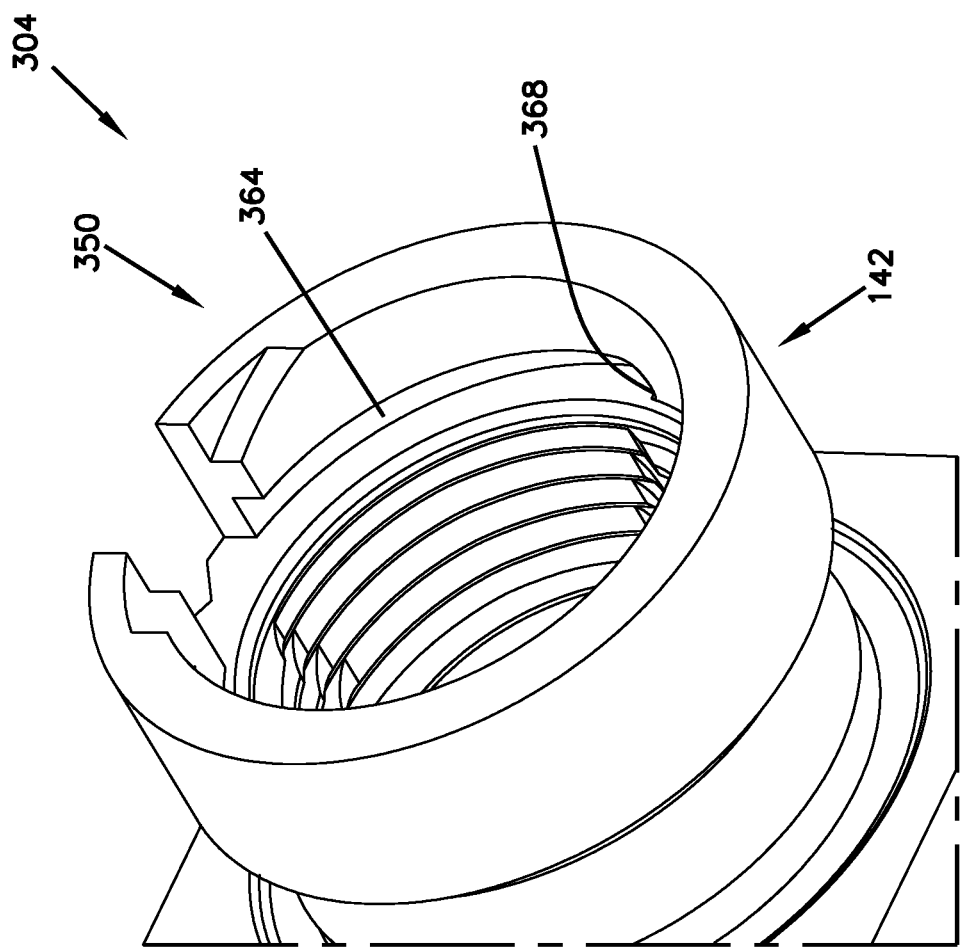
FIG. 9 is a perspective view of the adapter assembly of FIG. 8, illustrating an example rotation guide.

FIGS. 8 and 9 illustrate an adapter assembly 304 in accordance with another example of the present disclosure. As many of the concepts and features are similar to the adapter assembly 104, the description for the adapter assembly 104 is hereby incorporated by reference for the adapter assembly 304. Where like or similar features or elements are shown, the same or similar reference numbers will be used where possible. The following description for the adapter assembly 304 will be limited primarily to the differences from the adapter assembly 104.

In some embodiments, the rotation guide 354 includes a groove 364 configured to receive the key 122 of the fiber optic connector 102 as the fiber optic connector 102 rotates from the unlock position. Similar to the bayonet clearance slot 164, the groove 364 is provided circumferentially on the inner surface of the adapter assembly 304 and includes a stopper 368 configured to limit a rotation of the key 122 of the fiber optic connector 102 when the fiber optic connector 102 rotates relative to the adapter assembly 304 at a predetermined stop angle. Similar to the stopper 168, the first and second coupling mechanisms are configured to permit the fiber optic connector 102 to be in the lock position when the fiber optic connector 102 rotates relative to the adapter assembly 304 at an angle not greater than the predetermined stop angle.

As described above, the fiber optic connector 102 and the adapter assembly 104 and 304 provides faster and easier connections, as well as strong connections, between multiple fiber optic cables. The fiber optic connector 102 and the adapter assembly 104 and 304 are backwards compatible with existing fiber optic connection products. For example, the fiber optic connector 102 can be used with existing fiber optic adapters that have full nut threads formed therein in such a known manner that the fiber optic connector 102 is rotated relative to the existing adapters in one or more full turns. Similarly, the adapter assembly 104 and 304 can be used with existing fiber optic connectors that have full outer threads in such a known manner that the existing fiber optic connector is rotated relative to the adapter assembly 104 and 304 in one or more full turns.

Figure 10:
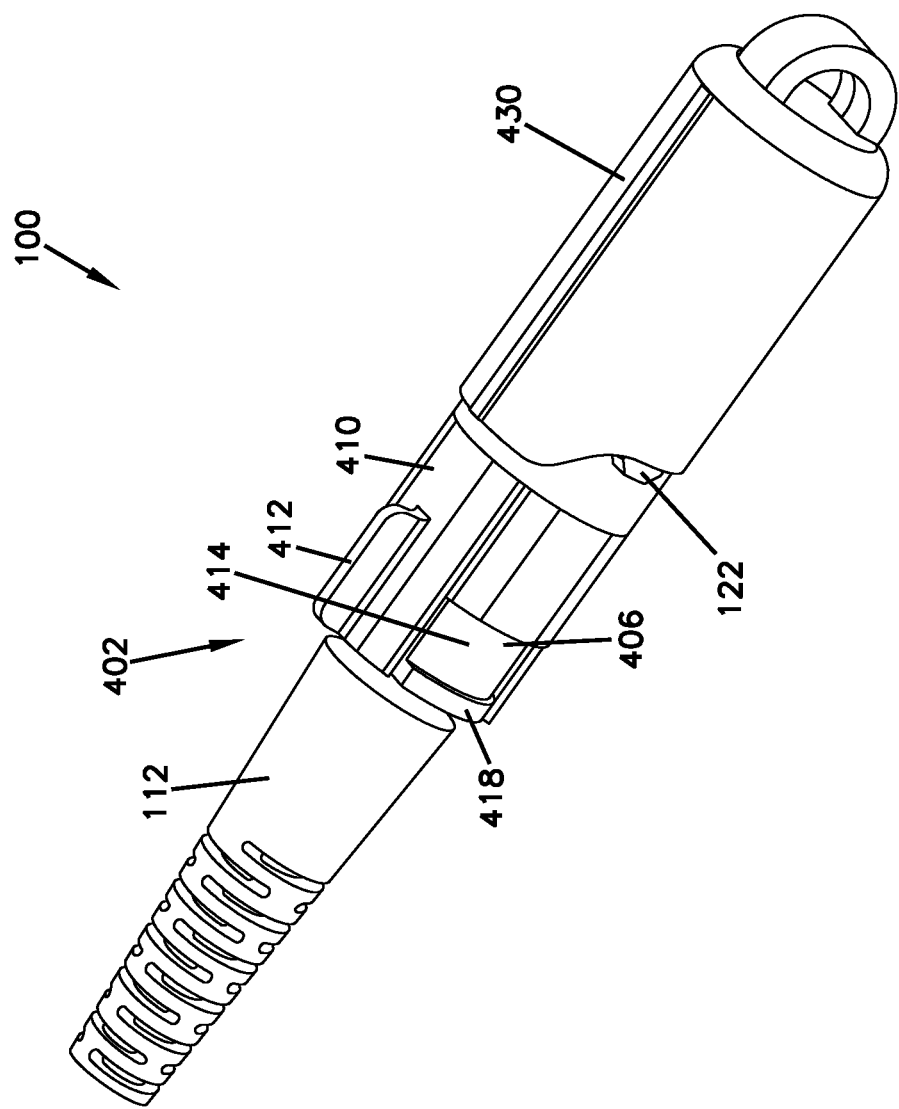
FIG. 10 is a perspective view of a fiber optic connector with a dust cap in accordance with an example of the present disclosure.
Figure 11:
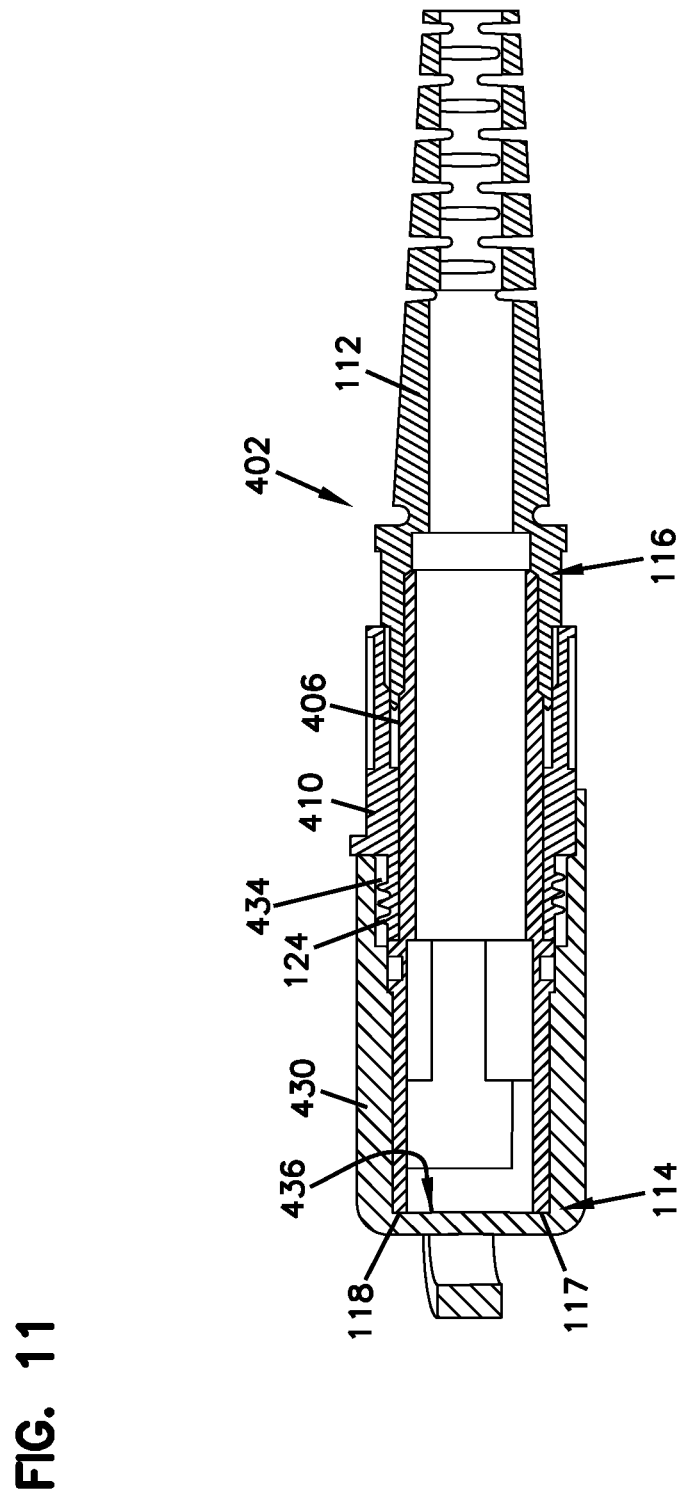
FIG. 11 is a cross-sectional view of the fiber optic connector of FIG. 10.
Figure 12:
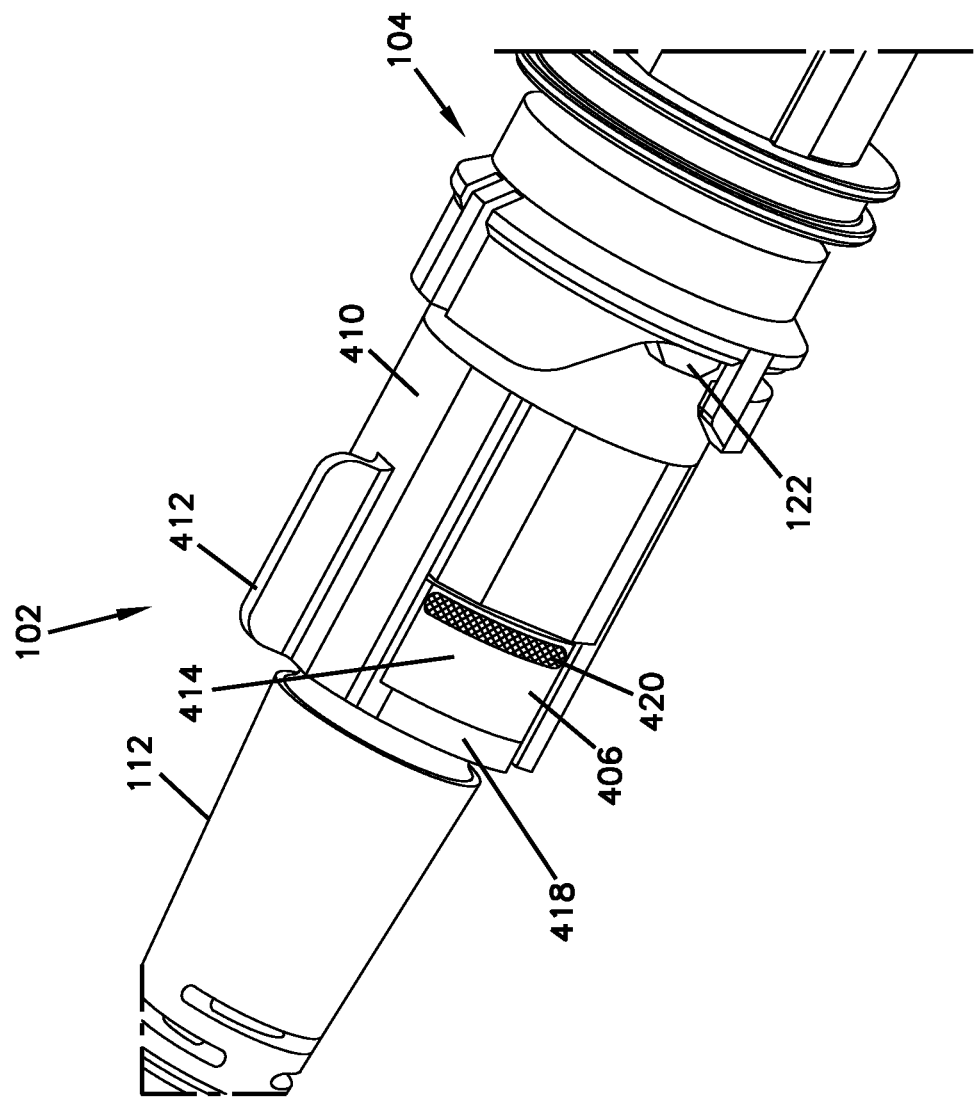
FIG. 12 is a perspective view of the fiber optic connector of FIG. 10, which is coupled to an adapter assembly.

FIGS. 10-12 illustrate a fiber optic connector 402 in accordance with another example of the present disclosure. As many of the concepts and features are similar to the fiber optic connector 102, the description for the fiber optic connector 102 is hereby incorporated by reference for the fiber optic connector 402. Where like or similar features or elements are shown, the same or similar reference numbers will be used where possible. The following description for the fiber optic connector 402 will be limited primarily to the differences from the fiber optic connector 102.

Similarly to the fiber optic connector 102, the fiber optic connector 402 includes a connector housing 406 and a coupling nut 410. The connector housing 406 corresponds to the connector housing 106, but further includes at least one protrusion 418 extending from the connector housing 406. The protrusion 418, together with a cut-out portion 414 (see below), operate to align the coupling nut 410 with the connector housing 406 in a predetermined position, as described below. The protrusion 418 is configured to engage the inner surface of the coupling nut 410 as the coupling nut 410 rotates around the connector housing 406. For example, the coupling nut 410 can slide over the protrusion 418 and becomes in frictional contact with the protrusion 418 as the coupling nut 410 rotates around the connector housing 406. In some embodiments, the connector housing 406 includes one protrusion 418. In other embodiments, the connector housing 406 includes a plurality of protrusions 418. In the depicted embodiment, two protrusions 418 are provided and equally spaced apart (i.e., 180 degree apart) on the connector housing 406.

The coupling nut 410 corresponds to the coupling nut 110, but further includes a tab portion 412 and a cut-out portion 414. The tab portion 412 extends from the outer surface of the coupling nut 410 and is configured to provide a grip for a user or installer so that the user or installer can easily hold the coupling nut 410 and rotate it relative to the adapter assembly 104 when installation. The tab portion 412 can also operate to provide a visual indication of a position of the coupling nut 410 relative to the connector housing 406, and/or of a position of the fiber optic connector 102 relative to the adapter assembly 104.

The cut-out portion 414 of the coupling nut 410 is configured to correspond to the protrusion 418 of the connector housing 406. As such, in the depicted example, two cut-out portions 414 are provided and equally spaced apart (i.e., 180 degree apart) on the coupling nut 410. The cut-out portion 414 is dimensioned such that the cut-out portion 414 can receive the entire circumferential length of the protrusion 418 when properly rotated. For example, when the coupling nut 410 rotates and slides over the protrusion 418, the coupling nut 410 is in frictional contact with the protrusion 418 of the connector housing 406 (i.e., an disengaging position). When the coupling nut 410 further rotates until the cut-out portion 414 of the coupling nut 410 mates with the protrusion 418, the protrusion 418 is received into the cut-out portion 414 and the coupling nut 410 is relieved of the friction contact with the protrusion 418 (i.e., an engaging position). The protrusion 418 received into the cut-out portion 414 can operate as a bump that requires a little more force to further rotate the coupling nut 410 to slide over the protrusion 418. As such, as the coupling nut 410 rotates around the connector housing 406, the cut-out portion 414 of the coupling nut 410 alternately engages either the protrusion 418 or the other flat portion of the connector housing 406. In the depicted embodiments, the cut-out portion 414 engages (or receives) the protrusion 418 as the coupling nut 410 rotates 180 degree relative to the connector housing 406.

In some embodiments, the cut-out portion 414 and the protrusion 418 can be used to align the coupling nut 410 to the connector housing 406 before the fiber optic connector 402 is coupled to the adapter assembly 104. Further, the cut-out portion 414 and the protrusion 418 can be used to indicate that the coupling nut 410 is in a proper arrangement relative to the connector housing 406, and that the fiber optic connector 402 is fully assemblied to the adapter assembly 104 in an appropriate manner. For example, the cut-out portion 414 and the protrusion 418 are arranged and configured such that, when the fiber optic connector 402 is fully coupled to the adapter assembly 104 in the appropriate manner, the cut-out portion 414 is arranged with the protrusion 418 so that the protrusion 418 is received into the cut-out portion 414, as depicted in FIG. 12.

In some embodiments, the connector housing 406 includes a visual indicator 420 configured to further present the arrangement of the coupling nut 410 relative to the connector housing 406.

Referring to FIGS. 10 and 11, the fiber optic connection system 100 can further include a removable dust cap 430. The dust cap 430 is configured to enclose at least part of the fiber optic connector 102 and 402 to protect the ferrule assembly 108 from dust particles or other contamination. The dust cap 430 can include a coupling mechanism for removably engaging the fiber optic connector 102 and 402. In some embodiments, the coupling mechanism of the dust cap 430 can include an internal thread 434 configured to engage the coupling thread 124 (e.g., the first and second threaded portions 130 and 132) of the coupling nut 110 and 410. In some embodiments, the internal thread 434 can be configured to be similar to the coupling nut thread 156 (e.g., the first and second threaded nut portions 180 and 182) of the adapter assembly 104 and 304, thereby allowing a quick coupling of the dust cap 430 to the fiber optic connector 102 and 402 with less than a full turn of the coupling nut 110 and 410.

In some embodiments, the dust cap 430 and the fiber optic connector 102 and 402 are configured not to rotate relative to each other when they are coupled. For example, the dust cap 430 includes a engaging feature that is formed on the inner circumferential surface adjacent the inner bottom face 436 and configured to prevent a rotation of the fiber optic connector 102 and 402 within the dust cap 430 when engaged. In some embodiments, the engaging feature is shaped to correspond to a flat tip portion 117 and a rounded tip portion 118 of the connector housing 106 and 406 at or adjacent the forward end 114, thereby preventing the rotation of the connector housing 106 and 406 relative to the dust cap 430. In this configuration, the coupling nut 110 and 410 is configured to remain rotatable around the connector housing 106 and 406 so that the coupling nut 110 and 410 is engaged with the coupling mechanism of the dust cap 430 as described above.

In some embodiments, the cut-out portion 414 and the protrusion 418 can be configured such that, when the dust cap 430 is fully coupled to the fiber optic connector 102 and 402, the cut-out portion 414 mates with the protrusion 418 as illustrated in FIG. 10. The cut-out portion 414 and the protrusion 418 can be further configured such that, when the dust cap 430 is removed from the fiber optic connector 102 and 402 by rotating the coupling nut 110 and 410 relative to the connector housing 106 and 406, the coupling nut 110 and 410 is in the position relative to the connector housing 106 and 406 that aligns the fiber optic connector 102 and 402 to the adapter assembly 104 and 304 in the unlock position. This can allow easy and fast installation of the fiber optic connector 102 and 402 to the adapter assembly 104 and 304.

FIGS. 13-16 illustrate additional features of the adapter assembly 104 of FIGS. 1-4, 6 and 7. In some embodiments, the adapter assembly 104 is configured to be mounted to, and supported by, an installation wall 94 (e.g., a bulkhead). In some embodiments, the installation wall 94 is part of a fiber optic enclosure (not shown). The adapter assembly 104 is mounted to the installation wall 94 such that the first end 142 (i.e., an outer port) and the second end 144 (i.e., an inner port) are arranged with the installation wall 94 interposed therebetween. In some embodiments, the first end 142 is disposed outside the fiber optic enclosure, and the second end 144 is disposed within the fiber optic enclosure. The adapter assembly 104 can further include an adapter housing 502 and an adapter retention member 504.

The adapter housing 502 includes the second coupling mechanism 150 as described above. The adapter housing 502 further includes a neck portion 506 and a sealing flange portion 508. The neck portion 506 is configured to removably engage the adapter retention member 504 thereon. In some embodiments, the neck portion 506 includes a set of flexible tabs 507 configured to snap into a set of corresponding slots 516 of the adapter retention member 504. The sealing flange portion 508 is configured to hold a sealing member 510, such as an O-ring, thereby providing a radial sealing of the adapter assembly 104 against the installation wall 94.

The adapter retention member 504 includes a cover portion 514 configured to engage the neck portion 506 of the adapter housing 502 to secure the adapter housing 502 onto the installation wall 94. As illustrated, the cover portion 514 includes snap-in slots 516 corresponding to the tabs 507 so that the adapter retention member 504 is snap-fit onto the adapter housing 502.

The adapter retention member 504 further includes an internal space 518 configured to receive a ferrule alignment mechanism 520. The ferrule alignment mechanism 520 defines a lengthwise, longitudinally extending passageway that is open through opposed ends. The ferrule alignment mechanism 520 is configured to receive and align the ferrules of the first and second fiber optic connectors 102 and 105 from the opposite ends. The ferrule alignment mechanism 520 can abut the distal end faces of the optical fibers of the first and second fiber optic cables 90 and 92.

In some embodiments, the adapter retention member 504 includes a plurality of spring members 522 to resiliently support the ferrule alignment mechanism 520 within the internal space 518 of the adapter retention member 504. For example, the spring members 522 are disposed within the adapter retention member 504 and bias the ferrule alignment mechanism 520 in the direction toward the adapter housing 502 while being compressible in the opposite direction. Thus, the ferrule alignment mechanism 520 can float to some extent within the adapter retention member 504 due to the spring member 522. In particular, the ferrule alignment mechanism 520 can move up and down and/or from side to side by the spring member 522 within the adapter retention member 504 so that the ferrule assembly 108 of the fiber optic connector 102 is properly aligned within the adapter assembly 104 when inserted.

Figure 14A:
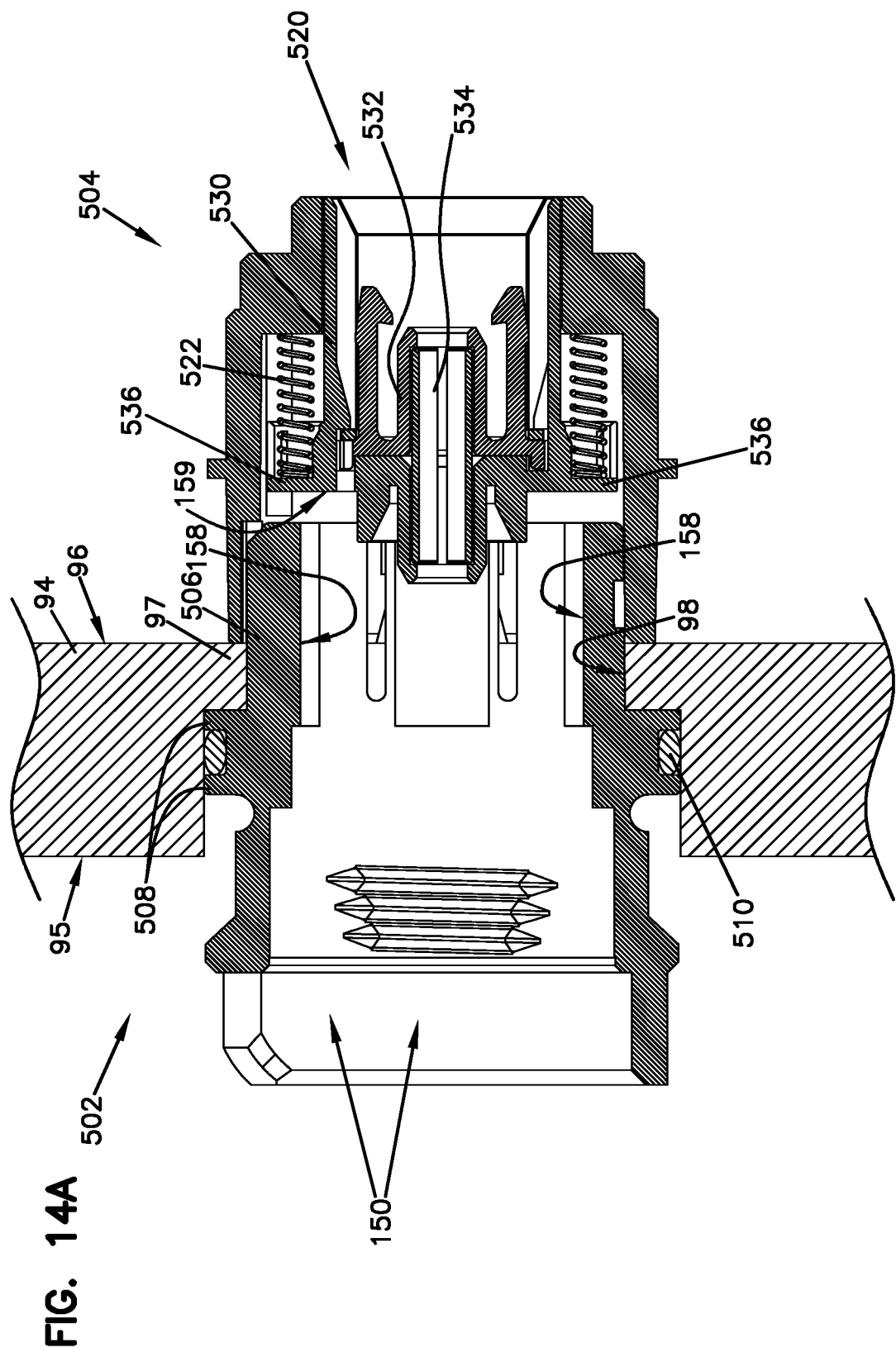
FIGS. 14A and 14B are cross-sectional views of the adapter assembly of FIG. 13.
Figure 16:
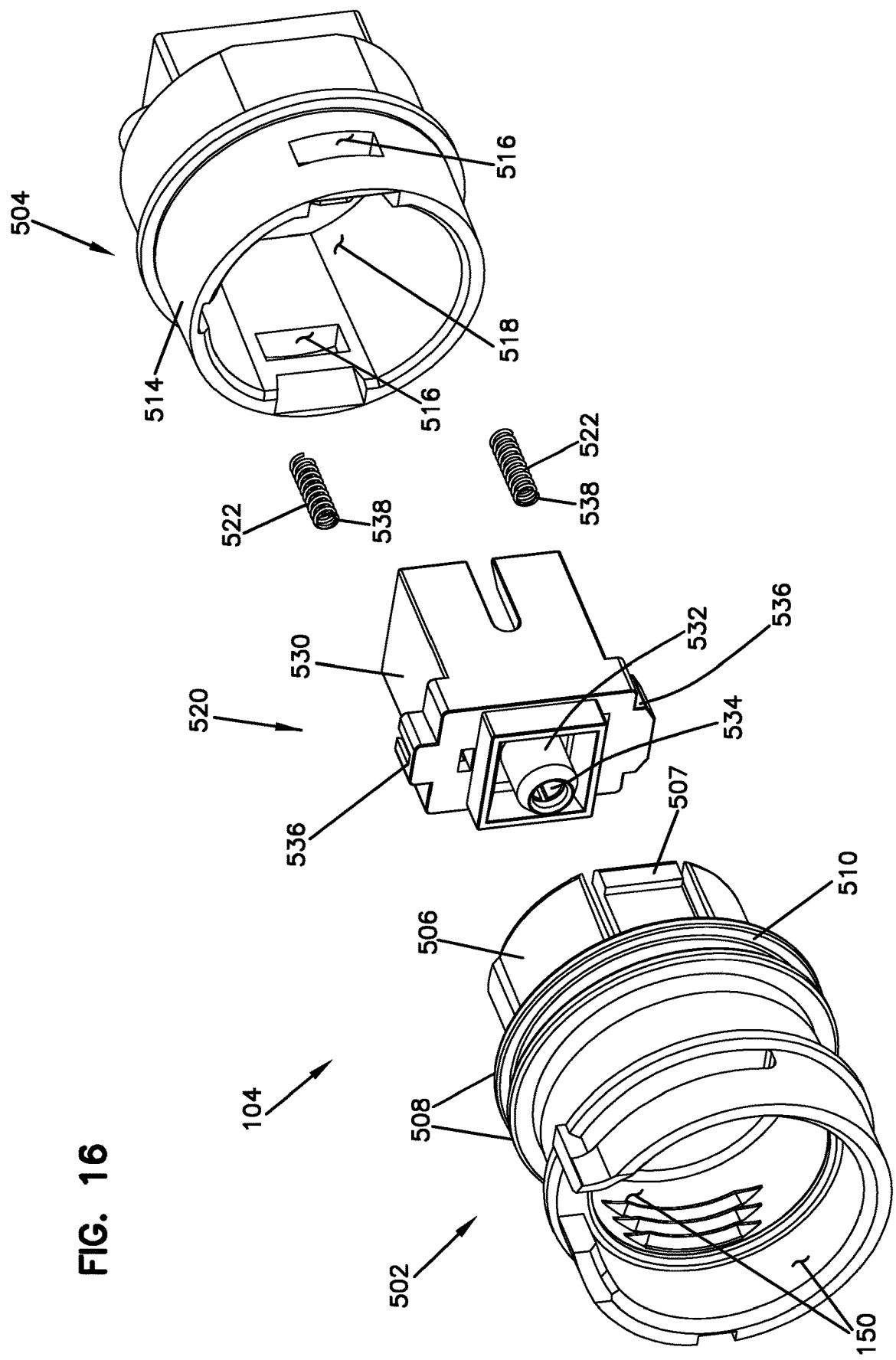
FIG. 16 is a further expanded view of the adapter assembly of FIG. 13.

In some embodiments, as illustrated in FIGS. 14A and 16, the ferrule alignment mechanism 520 includes a ferrule alignment housing 530. The ferrule alignment housing 530 has a central cylindrical portion 532 configured to house a ferrule alignment sleeve 534 therein. The ferrule alignment sleeve 534 is configured to receive the ferrules of two fiber optic connectors that are desired to be optically coupled, such that optical fibers supported by the ferrules are coaxially aligned within the ferrule alignment sleeve 534. The ferrule alignment sleeve 534 can be a split sleeve. In some embodiments, the ferrule alignment sleeve 534 is made of a resilient material that allows the ferrule alignment sleeve 534 (e.g., the split sleeve) to elastically flex open when a ferrule is received therein.

In some embodiments, the ferrule alignment housing 530 of the ferrule alignment mechanism 520 include one or more flanges 536 that are engaged by the spring members 522. The flanges 536 are configured to oppose ends 538 of the spring members 522 and capture the spring members 522 within the main adapter housing 502. The spring members 522 allow the ferrule alignment housing 530 to move axially within the main adapter housing 502 along a central axis that extends through the ferrule alignment sleeve 534. The spring members 522 also allow the ferrule alignment housing 530 to float and angularly adjust within the adapter housing 502 to facilitate receiving a ferrule within the ferrule alignment sleeve 534 as a fiber optic connector is inserted in ports defined in the adapter housing 502 and the adapter retention member 504.

Figure 13:
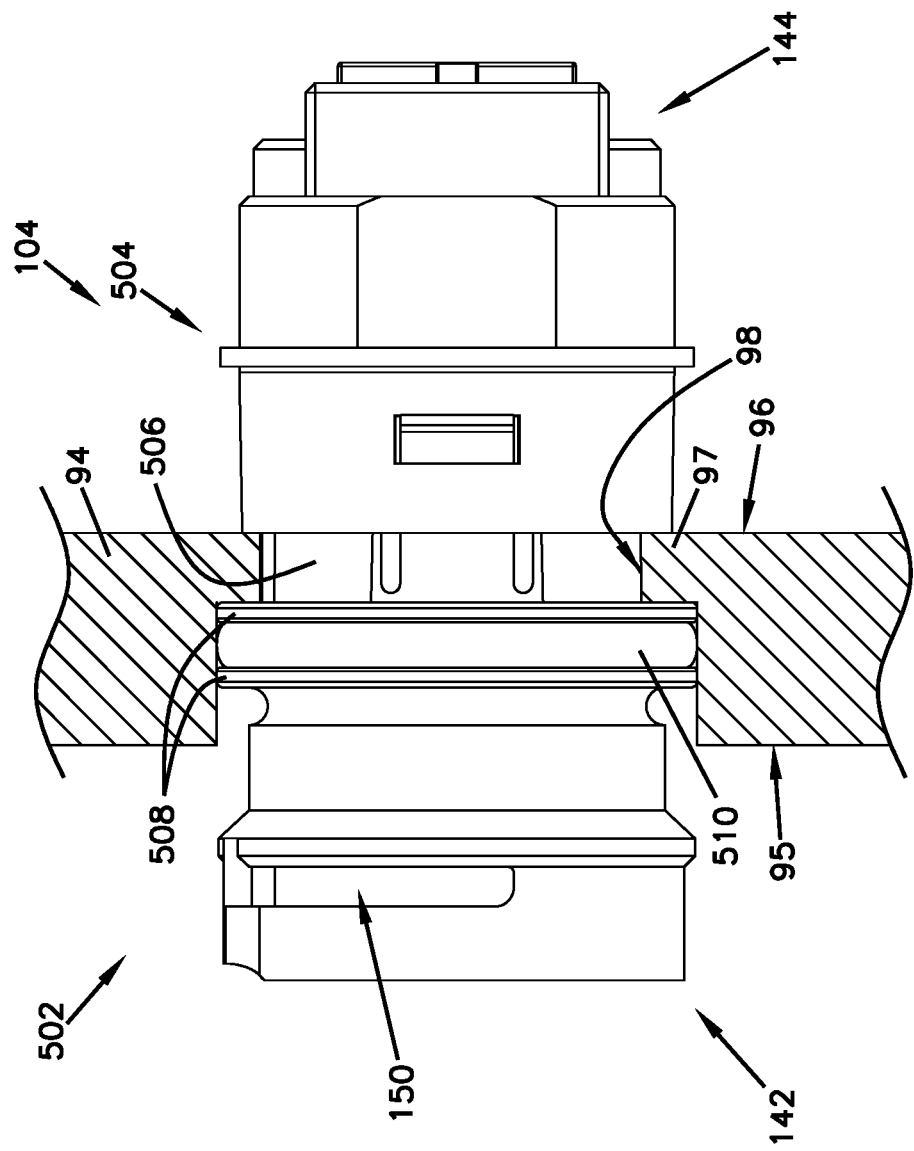
FIG. 13 is a side view of the adapter assembly of FIG. 6.
Figure 14B:
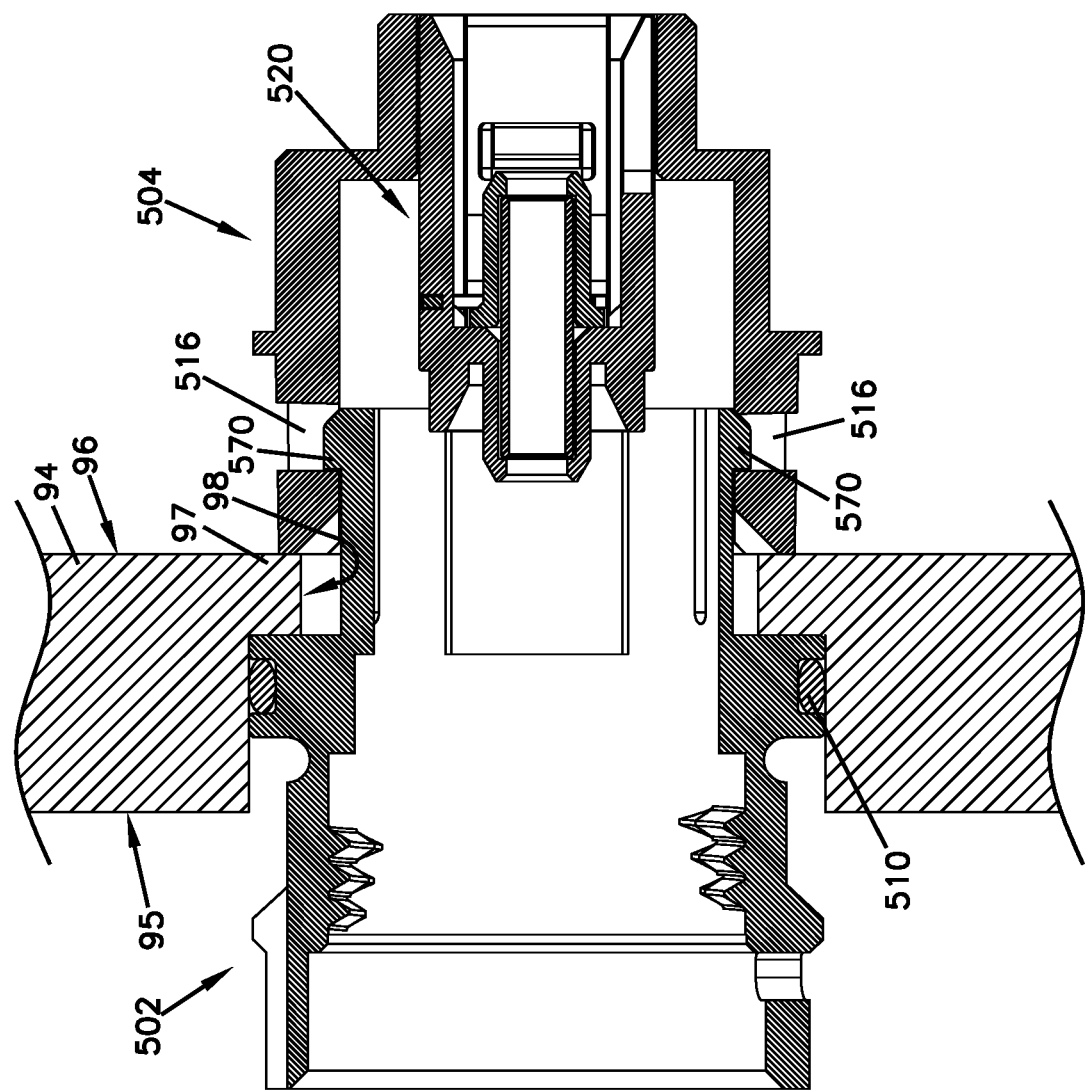
Figure 15:
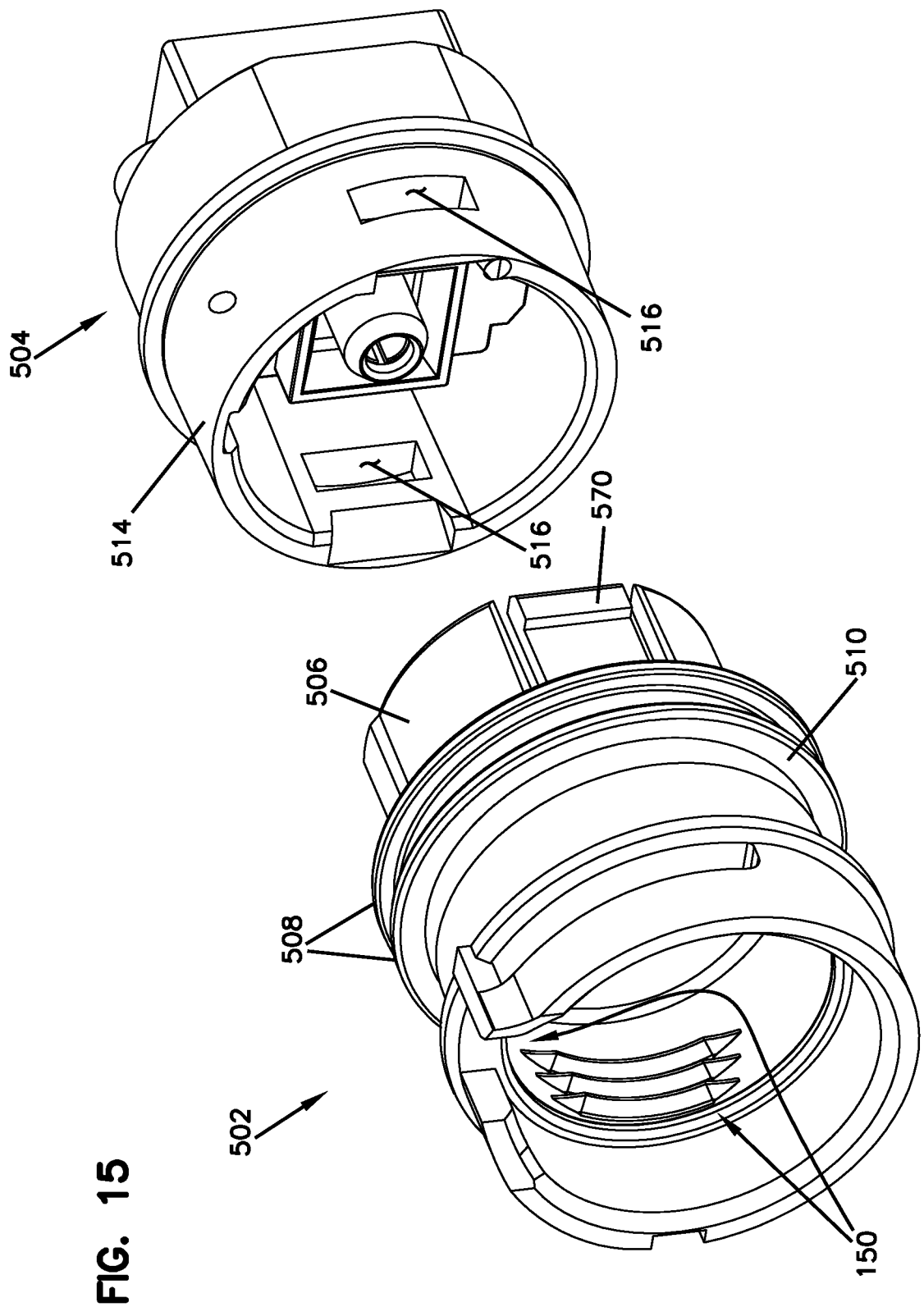
FIG. 15 is an expanded view of the adapter assembly of FIG. 13.

As illustrated in FIGS. 13, 14A and 14B, the adapter housing 502 can be configured to be positioned on a first side (i.e., exterior side) 95 of the installation wall 94 (e.g., on the outside of the bulkhead defined by a telecommunications closure or an enclosure), and the adapter retention member 504 can be configured to be positioned on an opposite second side (i.e., interior side) 96 of the installation wall 94 (e.g., on the inside of the bulkhead within the telecommunications closure or the enclosure). The adapter housing 502 can define an exterior, ruggedized port for receiving the connector 102, and the adapter retention member 504 can define an interior, non-ruggedized port for receiving the connector 105.

The adapter housing 502 and the adapter retention member 504 can cooperate to provide securement of the adapter assembly 104 to the installation wall 94. For example, the adapter housing 502 and the adapter retention member 504 can interlock such that a portion of the installation wall 94 is captured between the adapter housing 502 and the adapter retention member 504. In the depicted embodiment, the adapter housing 502 and the adapter retention member 504 are snap-fitted together when axially pressed toward each other. As described, the set of flexible tabs 507 of the adapter housing 502 can be snapped into the set of corresponding slots 516 of the adapter retention member 504.

As illustrated in FIGS. 13, 14A and 14B, the neck portion 506 of the adapter housing 502 is configured to be inserted into an installation port 98 of the installation wall 94 from the exterior side 95 such that the flange portion 508 engages with a wall shoulder 97. The sealing member 510 engaged by the sealing flange portion 508 can provide sealing between the adapter housing 502 and the inner surface of the installation port 98 of the installation wall 94. The sealing member 510 is radially, circumferentially abutted with the inner surface of the installation port 98 of the installation wall 94 to provide sealing therebetween. Then, the adapter retention member 504 is coupled to the adapter housing 502 from the interior side 96. When the adapter housing 502 and the adapter retention member 504 are coupled with the installation wall 94 positioned therebetween, an axial end face of the cover portion 514 of the adapter retention member 504 can be axially abutted to the interior side 96 of the installation wall 94, and an axial end face of the sealing flange portion 508 of the adapter housing 502 can be axially abutted to the wall shoulder 97 of the installation wall 94 while the sealing member 510 of the sealing flange portion 508 provides radial sealing between the adapter housing 502 and the installation port 98 of the installation wall 94.

In other embodiments, the adapter assembly 104 may be mounted to the installation wall 94 in different orders. For example, the adapter retention member 504 can be first inserted to the installation port 98 of the installation wall 94 within the enclosure, and then the adapter housing 502 can be inserted from the outside of the enclosure and coupled with the adapter retention member 504.

The radial sealing mechanism and the snap-fit coupling of the adapter assembly 106 as described above can provide easy and fast installation of the adapter housing 139, compared to existing adapter assemblies with axial face sealing members that requires additional steps to axially engage an independent sealing member over the adapter housing during installation. Further, in contrast to conventional adapter assemblies that employ a threaded engagement mechanism with a nut for engaging the adapter assembly to a bulkhead, the adapter assembly 106 with the radial sealing mechanism and the snap-fit coupling as described herein does not require such additional elements as a coupling nut. The adapter assembly in accordance with the present teachings can be simply and conveniently mounted to the bulkhead without a tool (such as a wrench) or without using a hand (such as an installer's thumb and forefinger) for screwing a coupling nut onto the adapter assembly. Therefore, the adapter assembly in accordance with the present teachings does not require an extra space for engaging the tool or the installer's fingers with the adapter assembly close to the installation wall, and thus allows arranging a plurality of the adapter assemblies on the installation wall in a higher density than the conventional adapter assemblies.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

LIST OF REFERENCE NUMERALS AND CORRESPONDING FEATURES

90 Cable
92 second fiber optic cable
94 installation wall
95 first side
96 second side
97 wall shoulder
98 installation port
100 fiber optic connection system
102 fiber optic connector
104 adapter assembly
105 second fiber optic connector
106 connector housing
108 ferrule assembly
110 coupling nut
112 strain relief boot
114 forward end
116 rearward end
117 flat tip portion
118 rounded tip portion
120 first coupling mechanism
122 key
124 coupling thread
126 outer surface
130 first threaded portion
132 second threaded portion
136 first unthreaded portion
138 second unthreaded portion
142 first end (outer port)
144 second end (inner port)
146 internal cavity
150 second coupling mechanism
152 key slot
154 rotation guide
156 coupling nut thread
158 anti-rotation mechanism
160 axial slot surface
164 bayonet clearance slot
166 dividing wall
168 stopper
172 first lateral surface
174 second lateral surface
180 first threaded nut portion
182 second threaded nut portion
186 first unthreaded nut portion
188 second unthreaded nut portion
190 inner surface
194 ferrule holder
304 adapter assembly
354 rotation guide
364 groove
368 stopper
402 fiber optic connector
406 connector housing
410 coupling nut
412 tab portion
414 at least one cut-out portion
418 at least one protrusion
420 visual indicator
430 dust cap
434 internal thread
436 inner bottom face
502 adapter housing
504 adapter retention member
506 neck portion
507 flexible tabs
508 sealing flange portion
510 sealing member
514 cover portion
516 snap-in slots
518 internal space
520 floating ferrule alignment mechanism
522 spring member
530 ferrule alignment housing
532 central cylindrical portion
534 ferrule alignment sleeve
536 flanges
538 spring member end

What is claimed is:

1. An assembly, comprising:
   an enclosure defining an interior of the enclosure and an exterior of the enclosure, the enclosure defining a port configured to receive a fiber optic connector that enters the port from the exterior of the enclosure;
   a housing extending away from the port to an end of the housing, the housing having at least a portion including the end positioned within the interior of the enclosure, a central axis of the housing being aligned with the port; and
   a retention member having a central axis aligned with the port, the retention member being positioned at the end of the housing, sleeved over and exterior to the housing and snap-fitted to the housing, the retention member supporting:
      a ferrule alignment housing that includes a ferrule alignment sleeve; and
      a spring that, when compressed, biases the ferrule alignment housing towards the port, the spring being positioned between a surface of the retention member and a surface of the ferrule alignment housing.

2. The assembly of claim 1, wherein the housing and the retention member are snap fitted together with flexible tabs that are snapped into corresponding slots.

3. The assembly of claim 2, wherein the housing includes the flexible tabs and the retention member includes the slots.

4. The assembly of claim 2, wherein the housing and the retention member snap fit together when pressed toward each other along the central axis of the housing and the central axis of the retention member.

5. The assembly of claim 1, further comprising a fiber optic connector extending through the port, the fiber optic connector including a ferrule positioned in the ferrule alignment sleeve.

6. The assembly of claim 1, further comprising a sealing member mounted to the housing.

7. The assembly of claim 1, wherein the spring is configured to allow the ferrule alignment housing to move within the retention member along the central axis of the retention member.

8. The assembly of claim 1,
   wherein the housing is secured relative to a wall of the enclosure; and
   wherein no coupling nut is provided to secure the housing relative to the wall.

9. The assembly of claim 1,
   wherein the housing includes a key slot and a rotation guide to receive and circumferentially guide a key of a fiber optic connector.

10. An assembly, comprising:
    a fiber optic connector defining a central axis, the fiber optic connector including:
       a connector housing that partially receives and supports a ferrule that terminates an optical fiber, the connector housing including a key protruding from a surface of the connector housing radially away from the central axis; and
       a coupling mechanism integrally formed with the connector housing, the coupling mechanism including threaded portions provided circumferentially around the axis, the threaded portions being circumferentially spaced apart from each other with an unthreaded portion positioned between the threaded portions; and
    a dust cap configured to removably mount to the connector housing, the dust cap being configured to enclose at least a portion of the fiber connector housing to protect the ferrule, the dust cap including an internal thread configured to engage the threaded portions of the coupling mechanism.

11. The assembly of claim 10,
    wherein the dust cap includes an engaging feature on in inner circumferential surface, the engaging feature configured to prevent a rotation of the fiber optic connector within the dust cap.

12. An assembly, comprising:
    an enclosure defining an interior of the enclosure and an exterior of the enclosure, the enclosure defining a port configured to receive a fiber optic connector that enters the port from the exterior of the enclosure;
    a housing extending away from the port to an end of the housing, the housing having at least a portion including the end positioned within the interior of the enclosure, a central axis of the housing being aligned with the port;
    a retention member having a central axis aligned with the port, the retention member being positioned at the end of the housing, sleeved over the housing and snap-fitted to the housing, the retention member supporting:
       a ferrule alignment housing that includes a ferrule alignment sleeve; and
       a spring that, when compressed, biases the ferrule alignment housing towards the port, the spring being positioned between a surface of the retention member and a surface of the ferrule alignment housing;
    a fiber optic connector defining a central axis, the fiber optic connector being configured to be received in the port, the housing and the retention member, and including:
       a connector housing that partially receives and supports a ferrule that terminates an optical fiber, the connector housing including a key protruding from a surface of the connector housing radially away from the central axis; and
       a coupling mechanism integrally formed with the connector housing, the coupling mechanism including threaded portions provided circumferentially around the axis, the threaded portions being circumferentially spaced apart from each other with an unthreaded portion positioned between the threaded portions; and
    a dust cap configured to removably mount to the connector housing when the fiber optic connector is not installed in the enclosure, the dust cap being configured to enclose at least a portion of the fiber connector housing to protect the ferrule, the dust cap including an internal thread configured to engage the threaded portions of the coupling mechanism.

* * * * *